United States Patent
Jang

(10) Patent No.: US 10,621,093 B2
(45) Date of Patent: Apr. 14, 2020

(54) HETEROGENEOUS COMPUTING SYSTEM CONFIGURED TO ADAPTIVELY CONTROL CACHE COHERENCY

(71) Applicant: Samsung Electronics Co., Ltd., Suwon-si, Gyeonggi-do (KR)

(72) Inventor: Hyunjun Jang, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 16/101,018

(22) Filed: Aug. 10, 2018

(65) Prior Publication Data

US 2019/0227936 A1 Jul. 25, 2019

(30) Foreign Application Priority Data

Jan. 25, 2018 (KR) .................. 10-2018-0009400

(51) Int. Cl.
| | |
|---|---|
| *G06F 12/08* | (2016.01) |
| *G06F 12/0817* | (2016.01) |
| *G06F 12/0842* | (2016.01) |
| *G06F 9/30* | (2018.01) |
| *G06F 9/54* | (2006.01) |
| *G06F 12/084* | (2016.01) |

(Continued)

(52) U.S. Cl.
CPC ...... *G06F 12/0817* (2013.01); *G06F 9/30043* (2013.01); *G06F 9/545* (2013.01); *G06F 12/084* (2013.01); *G06F 12/0842* (2013.01); *G06F 12/0866* (2013.01); *G06F 12/0824* (2013.01); *G06F 12/0831* (2013.01); *G06F 2212/1024* (2013.01); *G06F 2212/1028* (2013.01); *G06F 2212/621* (2013.01)

(58) Field of Classification Search
CPC .. G06F 9/30043; G06F 9/545; G06F 12/0815; G06F 12/0817; G06F 12/0824; G06F 12/0831; G06F 12/0837; G06F 12/084; G06F 12/0842; G06F 12/0866; G06F 2212/1024; G06F 2212/1028; G06F 2212/452; G06F 2212/621
USPC .................. 711/119, 121, 125, 130, 141
See application file for complete search history.

(56) References Cited

U.S. PATENT DOCUMENTS

| | | |
|---|---|---|
| 6,351,790 B1 | 2/2002 | Jones |
| 6,546,467 B2 | 4/2003 | Farrall et al. |
| 8,860,741 B1 | 10/2014 | Juffa et al. |

(Continued)

OTHER PUBLICATIONS

Agarwal et al., Selective GPU Caches to Eliminate CPU-GPU HW Cache Coherence, 2016 IEEE, pp. 494-506. (Year: 2016).*

(Continued)

*Primary Examiner* — Gary J Portka
(74) *Attorney, Agent, or Firm* — Myers Bigel, P.A.

(57) ABSTRACT

A heterogeneous computing system includes a first processor and a second processor that are heterogeneous. The second processor is configured to sequentially execute a plurality of kernels offloaded from the first processor. A coherency controller is configured to classify each of the plurality of kernels into one of a first group and a second group, based on attributes of instructions included in each of the plurality of kernels before the plurality of kernels are executed and is further configured to reclassify one of the plurality of kernels from the second group to the first group based on a transaction generated between the first processor and the second processor during execution of the one of the plurality of kernels.

20 Claims, 17 Drawing Sheets

(51) Int. Cl.
*G06F 12/0866* (2016.01)
*G06F 12/0831* (2016.01)

(56) References Cited

U.S. PATENT DOCUMENTS

| | | |
|---|---|---|
| 9,170,948 B2 | 10/2015 | Loh et al. |
| 9,400,702 B2 | 7/2016 | Chen et al. |
| 9,645,866 B2 | 5/2017 | Bourd et al. |
| 9,715,264 B2 | 7/2017 | Ghose |
| 2014/0379993 A1* | 12/2014 | Gupta ................ G06F 12/0808 711/135 |
| 2016/0092360 A1* | 3/2016 | Moll .................. G06F 12/0811 711/144 |
| 2016/0154449 A1 | 6/2016 | Lim et al. |
| 2017/0205863 A1 | 7/2017 | Lee et al. |
| 2018/0150322 A1* | 5/2018 | Dunham ............... G06F 9/4831 |

OTHER PUBLICATIONS

Basu et al., "Software Assisted Hardware Cache Coherence for Heterogeneous Processors," ADM Research Advanced Micro Devices, Inc., MEMSYS '16, Oct. 3-6, 2016, Washington DC.

Power, et al. "Heterogeneous System Coherence for Integrated CPU-GPU Systems," Micro-46, Dec. 7-11, 2013, Davis, CA.

\* cited by examiner

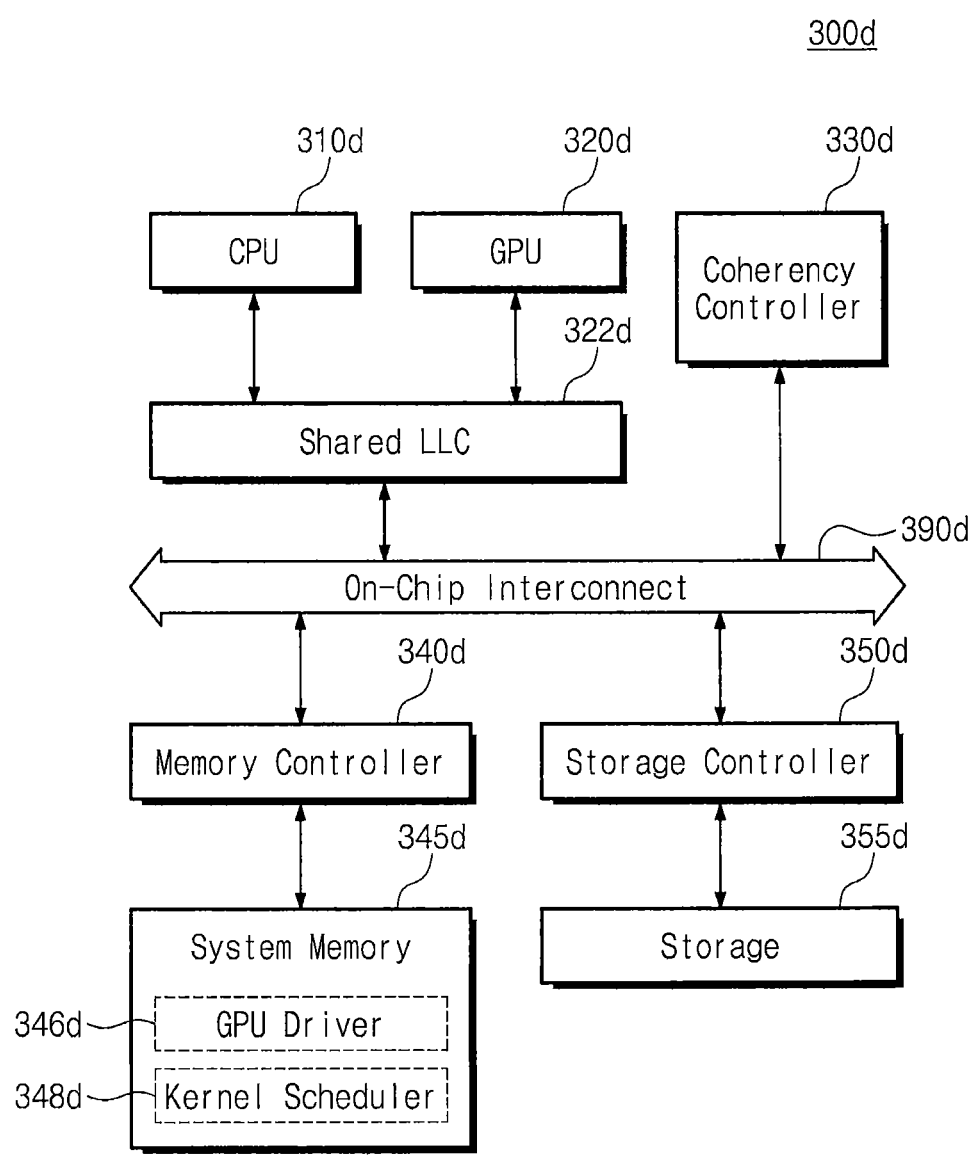

HETEROGENEOUS COMPUTING SYSTEM CONFIGURED TO ADAPTIVELY CONTROL CACHE COHERENCY

CROSS-REFERENCE TO RELATED APPLICATIONS

This application claims priority under 35 U.S.C. § 119 to Korean Patent Application No. 10-2018-0009400 filed on Jan. 25, 2018, in the Korean Intellectual Property Office, the disclosure of which is incorporated by reference herein in its entirety.

BACKGROUND

Embodiments of the inventive concept described herein relate to heterogeneous computing systems including different kinds of processors and, more particularly, to controlling a cache coherency in heterogeneous computing systems.

As semiconductor technology advances, computing systems including a plurality of processors are being actively researched. In particular, an application range of a heterogeneous computing system that includes not homogeneous processors, but heterogeneous processors is widening based on various factors including the ability to process complicated and various operations, the increase in demand of a user, etc. A heterogeneous computing system may include, in general, a central processing unit (CPU) and a graphic processing unit (GPU).

The assignment of tasks may be important to improve the computing capability of heterogeneous computing systems. Relatively complicated operations, such as graphic processing, is typically performed by the GPU. Processing of a program and/or kernel by the GPU may not be completed at a GPU stage, and a result of the processing of the program and/or kernel by the GPU may be shared with the CPU. In this process, because data are shared between the CPU and the GPU, cache coherency issues may occur.

When considering the cache coherency of a heterogeneous computing system, a workload of a program and/or kernel to be processed by the GPU is typically not considered. In general, the cache coherency is controlled in consideration of a cache hit or a cache miss. Therefore, when data sharing between the CPU and the GPU is frequent, a program and/or kernel may be processed in a non-cache coherent manner. When data are rarely or infrequently shared between the CPU and the GPU, a program and/or kernel may be processed in a cache coherent manner. The above-described data processing and cache management may not be desirable in terms of resource management, power management, and performance of a system.

SUMMARY

Embodiments of the inventive concept provide a heterogeneous computing system in which cache coherency is adaptively controlled based on data shared by a CPU and a GPU.

According to some embodiments of the inventive concept, a heterogeneous computing system may include a first processor, a second processor that is configured to sequentially execute a plurality of kernels offloaded from the first processor, the first processor and the second processor being heterogeneous, and a coherency controller that is configured to classify each of the plurality of kernels into one of a first group and a second group based on attributes of instructions included in each of the plurality of kernels, before the plurality of kernels are executed. The coherency controller is further configured to reclassify one of the plurality of kernels from the second group to the first group based on a transaction between the first processor and the second processor during execution of the one of the plurality of kernels.

According to other embodiments of the inventive concept, a method of operating a heterogeneous computing system, which includes a first processor and a second processor that are heterogeneous, may include offloading a plurality of kernels from the first processor to the second processor, classifying each of the plurality of kernels into one of a first group and a second group based on attributes of instructions included in each of the plurality of kernels, sequentially executing the plurality of kernels using the second processor, wherein first ones of the plurality of kernels belonging to the first group may be executed in a cache coherent manner and second ones of the plurality of kernels belonging to the second group may be executed in a non-cache coherent manner, and reclassifying one of the second ones of the plurality of kernels from the second group to the first group based on a transaction between the first processor and the second processor during execution of the one of the second ones of the plurality of kernels.

According to an further embodiments of the inventive concept, a heterogeneous computing system may include a CPU, a GPU that sequentially executes a plurality of kernels offloaded from the CPU, and a coherency controller that is configured to classify each of the plurality of kernels into one of a first group and a second group based on attributes of instructions included in each of the plurality of kernels before the plurality of kernels are executed, and is further configured to reclassify one of the plurality of kernels from the second group to the first group based on a transaction between the CPU and the GPU during execution of the one of the plurality of kernels.

BRIEF DESCRIPTION OF THE FIGURES

The above and other objects and features of the inventive concept will become apparent by describing in detail example embodiments thereof with reference to the accompanying drawings.

FIG. 3D is a block diagram illustrating another example configuration of a heterogeneous computing system illustrated in FIG. 2 according to some embodiments of the inventive concept.

DETAILED DESCRIPTION

Hereinafter, embodiments of the inventive concept will be described in detail with reference to the attached drawings. Like reference numbers signify like elements throughout the description of the figures. It is noted that aspects of the invention described with respect to one embodiment, may be incorporated in a different embodiment although not specifically described relative thereto. That is, all embodiments and/or features of any embodiment can be combined in any way and/or combination.

As used herein, the term "real time" means the performing of an operation without the insertion of any scheduled or artificial delay.

Some embodiments of the inventive concept stem from a realization that in a heterogeneous computing system including, for example, a central processing unit (CPU) and a graphic processing unit (GPU), cache coherency may be managed primarily based on cache hits and misses by the different processors. This may result in instances where a kernel is executed in a non-cache coherent manner even when data is frequently shared between the processors and in instances where a kernel is executed in a cache coherent manner even when data is rarely shared between the processors. Embodiments of the present invention may provide a cache coherency controller that is configured to classify kernels, prior to execution, as being in a non-cache coherent group or a cache coherent group based on an analysis of their respective instructions. The cache coherency controller, however, may further be configured to reclassify kernels between the two groups, such as reclassifying a kernel from the non-cache coherent group to the cache coherent group based on an analysis of data sharing between the processors when the kernel is being executed. As a result, the reclassification may improve system performance by adaptively using the cache memory for those kernels in which data is more likely and/or more frequently shared between the processors.

Figure 1:
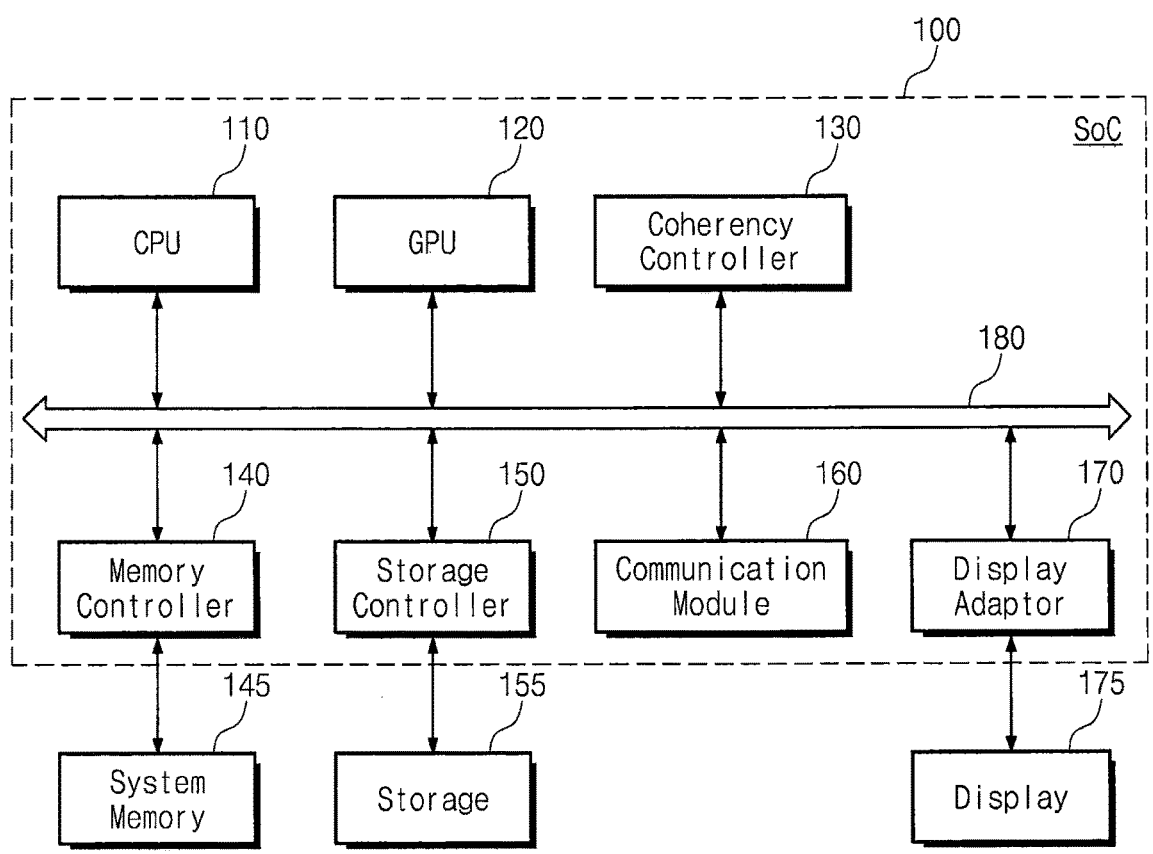
FIG. 1 is a block diagram illustrating an example configuration of a heterogeneous computing system according to an embodiment of the inventive concept.

FIG. 1 is a block diagram illustrating an example configuration of a heterogeneous computing system 100 according to some embodiments of the inventive concept. The heterogeneous computing system 100 may include two or more heterogeneous processors 110 and 120 and a coherency controller 130. Components that constitute the heterogeneous computing system 100 may be communicatively connected through a bus 180.

In addition, in another embodiment, a system on chip SoC may be implemented to include a memory controller 140, a storage controller 150, a communication module 160, and a display adapter 170. A system memory 145 may be connected to the memory controller 140. Storage 155 may be connected to the storage controller 150. A display 175 may be connected to the display adapter 170.

The heterogeneous computing system 100 may comprise one or more electronic devices, such as a desktop computer, a laptop computer, a tablet, a smartphone, a wearable device, a video game console, a workstation, and a server. In some embodiments, the two or more heterogeneous processors 110 and 120 and the coherency controller 130 may be a system on chip SoC implemented in such devices.

The two or more heterogeneous processors 110 and 120 may be provided in one chip to provide a heterogeneous computing environment. For example, the two or more heterogeneous processors 110 and 120 may include a central processing unit (CPU) 110 and a graphic processing unit (GPU) 120.

The CPU 110 may control overall operations of the heterogeneous computing system 100. The CPU 110 may process various kinds of arithmetic operations and/or logical operations. In some embodiments, the CPU 110 may be a multi-core processor including one or more processor cores. The CPU 110 may include cache memories used by the one or more processor cores to perform various operations. The cache memories may temporarily store commands and/or parameter values, which are used by the CPU 110 to execute an application.

The GPU 120 may perform 2D and/or 3D processing. The GPU 120 may be used to perform rendering to output an image through the display 175. In addition, the GPU 120 may be used to perform complicated operations, such as calculation of a geometrical structure and calculation of scalar and vector floating points. The GPU 120 may execute various commands that are encoded by using an application programming interface (API) such as OpenCL, OpenGL, or WebGL. The GPU 120 may include a dedicated memory. In this case, the dedicated memory that is embedded in the GPU 120 or is connected to the GPU 120 may be used as a frame buffer, a texture map, and/or an array storage space.

The coherency controller 130 may be configured to maintain a cache coherency between the CPU 110 and the GPU 120. For example, the coherency controller 130 may control information about data and/or variables frequently exchanged between the CPU 110 and the GPU 120. For example, the coherency controller 130 may allow the CPU 110 to share a processing result of kernels, which are offloaded from the CPU 110 and are processed by the GPU 120.

As will be more fully described below, the coherency controller 130 may in advance analyze kernels that are offloaded from the CPU 110 and will be executed by the GPU 120 and may classify the kernels into two groups. For example, a first group of the classified groups may include kernels having a memory-bound characteristic in which data sharing between the CPU 110 and the GPU 120 frequently occurs. A second group of the classified groups may include kernels having a compute-bound characteristic in which data sharing between the CPU 110 and the GPU 120 rarely or less frequently occurs.

In addition, the coherency controller 130 may reclassify the kernels belonging to the second group while kernels are executed by the GPU 120. For example, the coherency controller 130 may reclassify a kernel determined as a kernel that belongs to the second group, but experiences frequent data sharing between the CPU 110 and the GPU 120, as the first group. A processing result of a kernel belonging to the first group may be shared by the CPU 110 and the GPU 120 through cache memories included in the CPU 110 and the GPU 120. In contrast, a processing result of a kernel belonging to the second group may be shared by the CPU 110 and the GPU 120 through the system memory 145.

The memory controller 140 may control the system memory 145. For example, the memory controller 140 may control data input/output between the heterogeneous computing system 100 and the system memory 145.

The system memory 145 may temporarily store data processed or to be processed by the CPU 110 and/or the GPU 120. In a booting operation, an operating system (OS), basic application programs, and/or firmware is loaded to the system memory 145. For example, upon booting the heterogeneous computing system 100, an OS image stored in the storage 155 may be loaded to the system memory 145 based on a booting sequence. Overall input/output operations of the heterogeneous computing system 100 may be supported by the operating system OS. In addition, application programs and/or firmware (e.g., associated with graphic processing), selected by a user or for providing a basic service, may be loaded to the system memory 145.

For example, the system memory 145 may include a volatile memory, such as a dynamic random access memory (DRAM) or a synchronous DRAM (SDRAM), and/or a nonvolatile memory, such as a phase-change RAM (PRAM), a magneto-resistive RAM (MRAM), a resistive RAM (ReRAM), or a ferro-electric RAM (FRAM). However, for purpose of description, below, it is assumed that a system memory is implemented with DRAMs that are based on a double data rate (DDR) interface.

The storage controller 150 may control the storage 155. For example, the storage controller 150 may control data input/output between the heterogeneous computing system 100 and the storage 155.

The storage 155 may include one or more memory devices and a controller. The memory devices of the storage 155 may retain data regardless of power supply. For example, the storage 155 may include a nonvolatile memory, such as a flash memory, a PRAM, an MRAM, a ReRAM, or a FRAM. For example, the storage 155 may include a storage medium, such as a solid state drive (SSD), removable storage, embedded storage, etc.

The communication module 160 may communicate with an external device/system of the heterogeneous computing system 100. As illustrated in FIG. 1, at least a part of the functions of the communication module 160 may be merged into the SoC including the CPU 110, the GPU 120, and the coherency controller 130. However, in other embodiments, the communication module 160 may be a function block, a circuit, or a semiconductor chip manufactured independently of the SoC.

For example, the communication module 160 may support one or more wireless communication protocols such as, but not limited to, long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID), and/or one or more wired communication protocols, such as, but not limited to, transfer control protocol/Internet protocol (TCP/IP), universal serial bus (USB), and Firewire.

The bus 180 may provide a communication path between the components of the heterogeneous computing system 100. For example, the bus 180 may include an off-chip interconnect. The components of the heterogeneous computing system 100 may exchange data with each other based on a bus format of the bus 180. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

Figure 2:
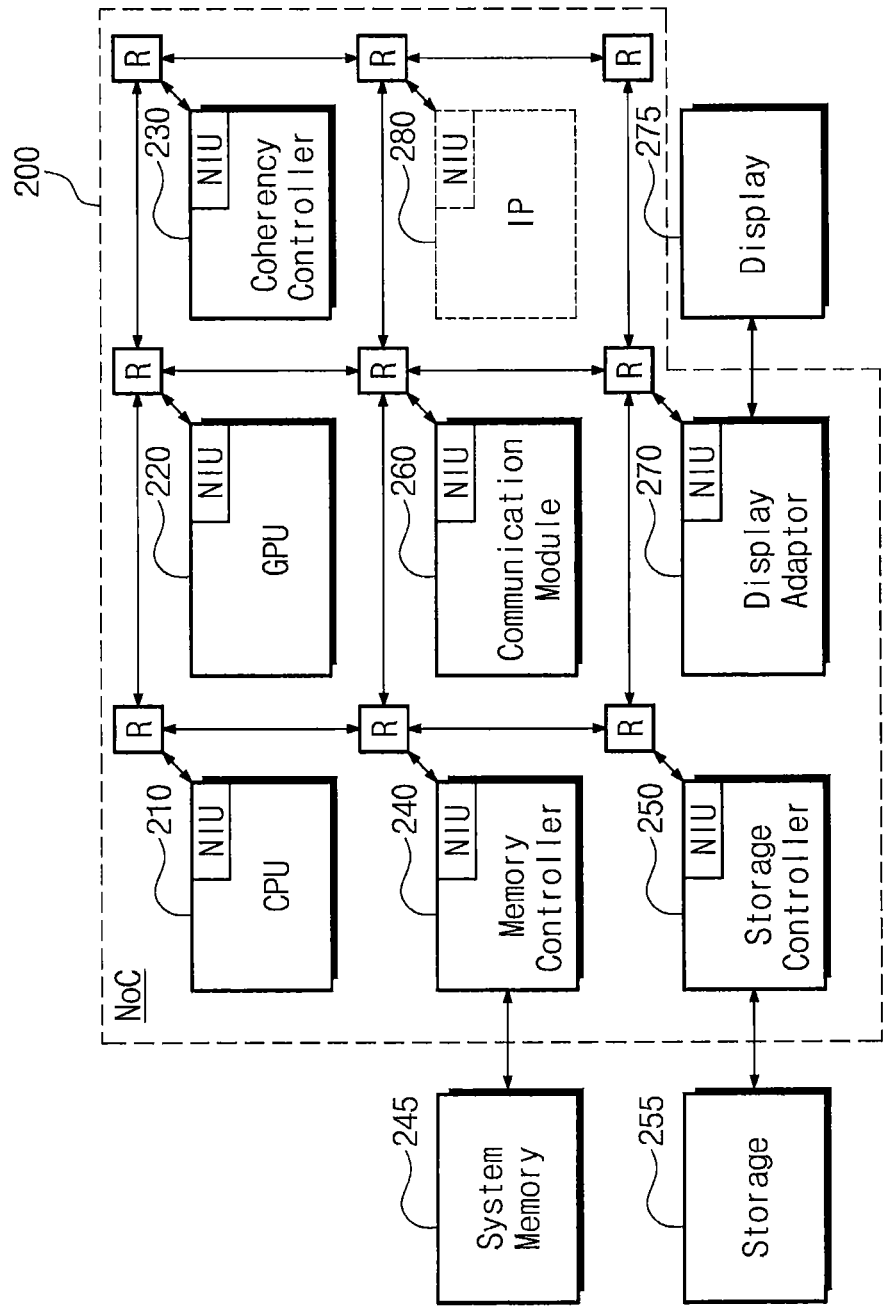
FIG. 2 is a block diagram illustrating an example configuration of a heterogeneous computing system according to some embodiments of the inventive concept.

FIG. 2 is a block diagram illustrating an example configuration of a heterogeneous computing system according to some embodiments of the inventive concept. Unlike the embodiments described with reference to FIG. 1, a heterogeneous computing system 200 may be implemented with a network on chip (NoC) that is based on an on-chip interconnect.

The heterogeneous computing system 200 may comprise one or more modules including hardware intellectual properties (IPs). The hardware IPs may comprise two or more heterogeneous processors 210 and 220, a coherency controller 230, a memory controller 240, a storage controller 250, a communication module 260, and a display adapter 270. A configuration of the heterogeneous computing system 200 is not limited thereto. For example, the heterogeneous computing system 200 may further include a hardware IP 280. For example, the hardware IP 280 may be a user interface for providing convenience to a user, such as a camera module, an audio module, or a touch pad.

A system memory 245 may be connected to the memory controller 240, and storage 255 may be connected to the storage controller 250. A display 275 may be connected to the display adapter 270. The hardware IPs are substantially the same as the components described with reference to FIG. 1, and, thus, a detailed description thereof will not be repeated here.

However, each of the hardware IPs may include a network interface unit NIU. The network interface unit NIU provides an interface for communication between hardware IPs. The hardware IPs may be connected to each other through the network interface unit NIU and a router "R". For example, the router "R" may include a buffer and an on-chip network switch. The hardware IPs may be communicatively connected by a switching operation of the on-chip network switch.

Routers "R", physical links connecting the routers "R" each other, and physical links connecting the router "R" and the network interface unit NIU are referred to as an "on-chip interconnect". Parallel communication between the hardware IPs may be performed through the on-chip interconnect.

According to the example configurations of the heterogeneous computing systems 100 and 200 briefly described above, kernels offloaded from a CPU are analyzed in advance and in real time. Because data sharing between a CPU and a GPU is made through a cache memory based on a result of the analysis, a speed at which shared data are accessed may be improved. In addition, because data are not shared unnecessarily through a system memory, a reduction or degradation of system performance may be prevented or reduced.

Figure 3A:
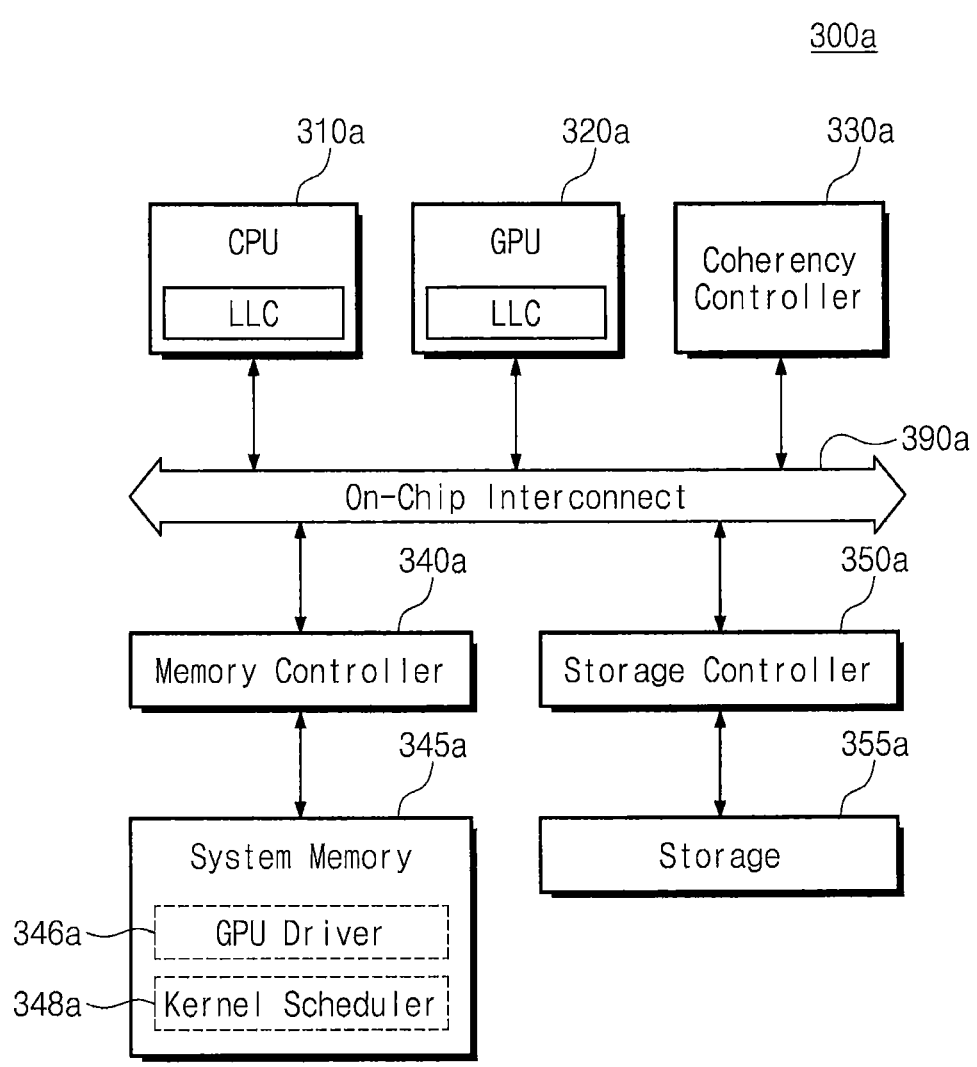
FIG. 3A is a block diagram illustrating another example configuration of a heterogeneous computing system illustrated in FIG. 2 according to some embodiments of the inventive concept.

FIG. 3A is a block diagram illustrating an example configuration of the heterogeneous computing system 200 illustrated in FIG. 2 according to some embodiments of the inventive concept. A heterogeneous computing system 300a may include a CPU 310a, a GPU 320a, a coherency controller 330a, a memory controller 340a, a system memory 345a, a storage controller 350a, and storage 355a. The components of the heterogeneous computing system 300a respectively correspond to components that are illustrated in FIG. 2 and have similar reference numerals. Therefore, a description given above will not be repeated below, and specific operations of the heterogeneous computing system 300a will be described based on differences between the earlier described embodiments.

Each of the CPU 310a and the GPU 320a includes a last level cache LLC. Although not illustrated in FIG. 3A for brevity of illustration, each of the CPU 310a and the GPU 320a may further include an upper level cache. The CPU 310a and the GPU 320a may communicate with the coherency controller 330a through an on-chip interconnect 390a. The on-chip interconnect 390a may support data sharing between the CPU 310a and the GPU 320a, which is performed by using at least one of the last level caches LLC.

The coherency controller 330a may communicate with the components of the heterogeneous computing system 300a through the on-chip interconnect 390a. The on-chip interconnect 390a may support both a cache coherency interconnect CCI and a non-cache coherency interconnect NCCI. The on-chip interconnect 390a may include an on-chip network switch (e.g., included in the router "R" of FIG. 2) that performs a switching operation between the CCI and the NCCI, such that data processed by the CPU 310a and/or the GPU 320a are processed by any other hardware/software component.

A GPU driver 346a provides an interface that enables an application loaded to the system memory 345a to communicate with the GPU 320a. For example, the GPU driver 346a may call a program from an application to be executed on the heterogeneous computing system 300a or framework. The program called by the GPU driver 346a may be executed by the GPU 320a. That is, the program called by the GPU driver 346a may include a plurality of kernels (hereinafter referred to as "GPU kernels") offloaded by the CPU 310a so as to be executed on the GPU 320a. The GPU driver 346a may be loaded to the system memory 340a.

A kernel scheduler 348a may schedule kernels to be executed on the CPU 310a and/or the GPU 320a, and threads of each kernel. The kernel scheduler 348a may analyze and identify the kernels to be executed on the CPU 310a and/or the GPU 320a. In addition, the kernel scheduler 348a may be a program generated by using an API such as OpenGL. The kernel scheduler 348a may be a program that is stored in the storage 355a and is loaded to and executed on the system memory 345a.

Figure 3B:
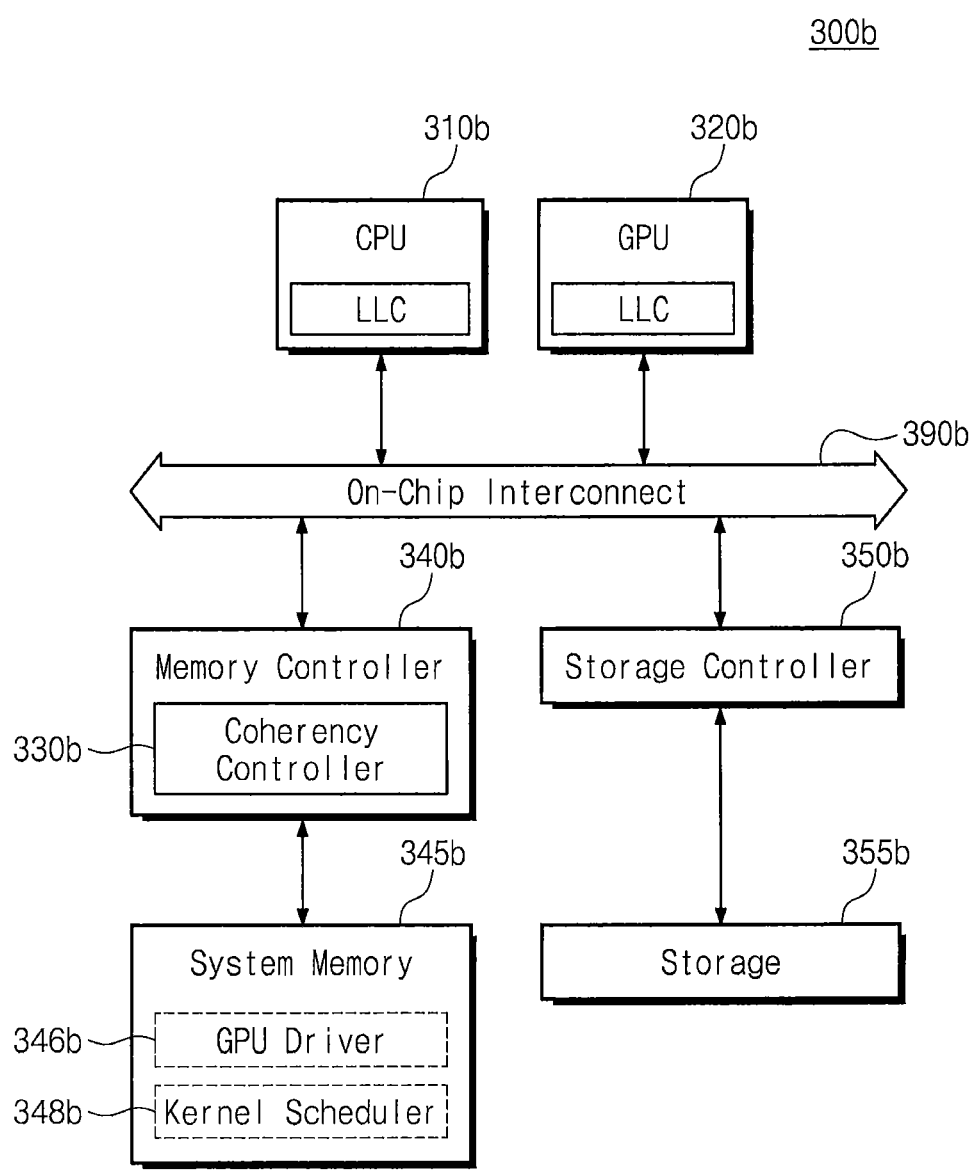
FIG. 3B is a block diagram illustrating another example configuration of a heterogeneous computing system illustrated in FIG. 2 according to some embodiments of the inventive concept.

FIG. 3B is a block diagram illustrating another example configuration of the heterogeneous computing system 200 illustrated in FIG. 2 according to some embodiments of the inventive concept. A configuration and operations of a heterogeneous computing system 300b are similar to the heterogeneous computing system 300a illustrated in FIG. 3A, and a description will be given based on differences with the earlier described embodiments.

A CPU 310b and a GPU 320b may communicate with hardware and software components constituting the heterogeneous computing system 300b through an on-chip interconnect 390b. In particular, a coherency controller 330b controlling data sharing between the CPU 310b and the GPU 320b may be provided in a memory controller 340b. In the embodiment of FIG. 3B, the on-chip interconnect 390b may support both the CCI and the NCCI.

The coherency controller 330b may be implemented in the memory controller 340b. For example, data that are associated with a GPU kernel in which data sharing between the CPU 310b and the GPU 320b is frequently made may be referenced by a cache coherency directory of the coherency controller 330b. That is, because data are shared by using the last level caches LLC of the CPU 310b and the GPU 320b instead of a system memory 345b, a processing speed of a GPU kernel may be improved, and unnecessary wasting of the system memory 345b resource may be prevented or reduced.

Figure 3C:
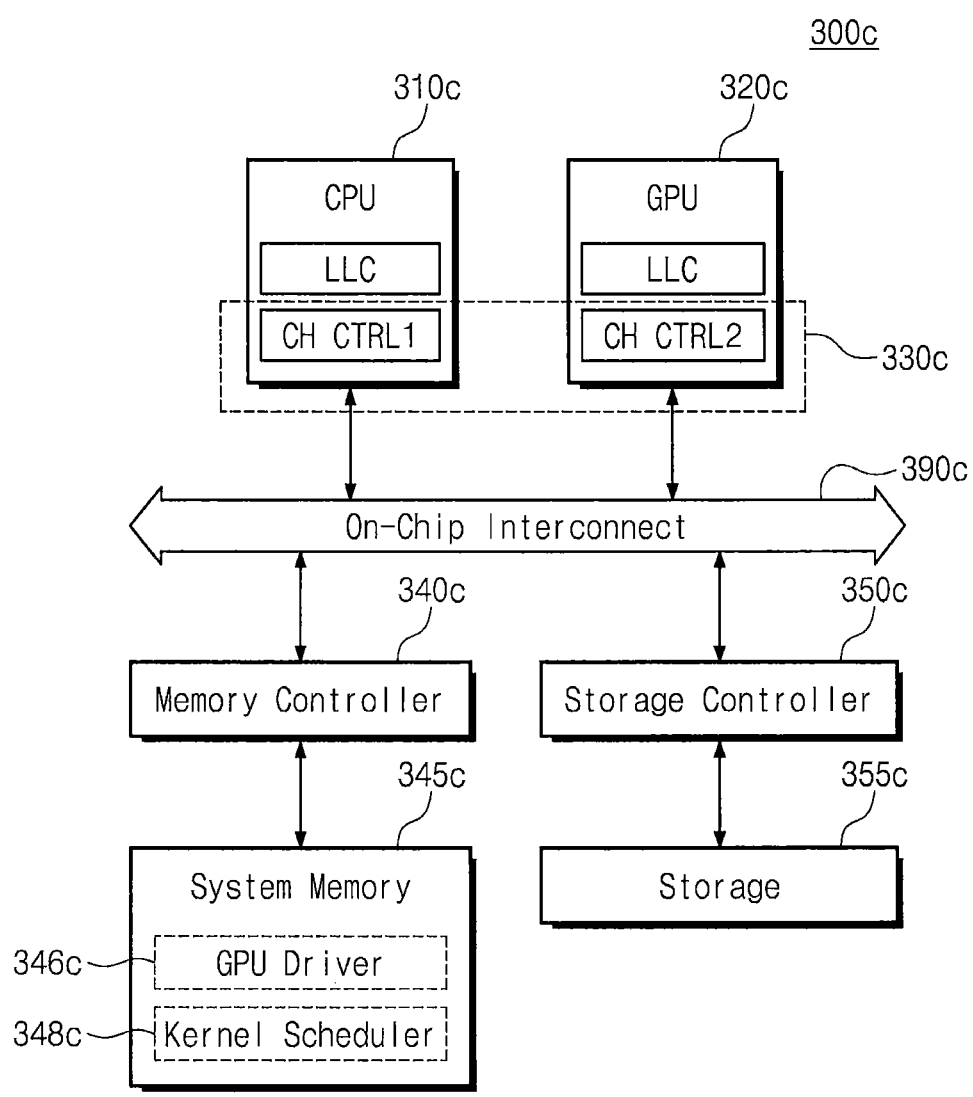
FIG. 3C is a block diagram illustrating another example configuration of a heterogeneous computing system illustrated in FIG. 2 according to some embodiments of the inventive concept.

FIG. 3C is a block diagram illustrating another example configuration of the heterogeneous computing system 200 illustrated in FIG. 2 according to some embodiments of the inventive concept. A configuration and operations of a heterogeneous computing system 300c are similar to the heterogeneous computing system 300a or 300b illustrated in FIG. 3A or 3B, and a description will be based on differences with the earlier described embodiments.

A coherency controller 330c may be implemented in both a CPU 310c and a GPU 320c. For example, a first coherency controller CH CTRL1 may be implemented in the CPU 310c, and a second coherency controller CH CTRL2 may be implemented in the GPU 320c. The first coherency controller CH CTRL1 and the second coherency controller CH CTRL2 may not be configured to store the same data. That is, the second coherency controller CH CTRL2 may not be a replica of the first coherency controller CH CTRL1. However, the first coherency controller CH CTRL1 and the second coherency controller CH CTRL2 may be connected to share data with each other through an on-chip interconnect 390c.

For example, data that are associated with a GPU kernel in which data sharing between the CPU 310c and the GPU 320c is frequently made may be referenced by a cache coherency directory of the first coherency controller CH CTRL1 or a cache coherency directory of the second coherency controller CH CTRL2. That is, data are shared by using last level caches LLC of the CPU 310c and the GPU 320c instead of a system memory 345c.

FIG. 3D is a block diagram illustrating another example configuration of the heterogeneous computing system 200 illustrated in FIG. 2 according to some embodiments of the inventive concept. A configuration and operations of a heterogeneous computing system 300d is similar to the heterogeneous computing system 300a illustrated in FIG. 3A, and a description will be based on differences with the earlier described embodiments. However, the heterogeneous computing system 300d may include a shared last level cache. For example, the shared last level cache may be implemented outside a CPU 310d and a GPU 320d.

The example configurations of the heterogeneous computing system 200 of FIG. 2 are described with reference to FIGS. 3A to 3D. However, the inventive concept is not limited to a network on-chip that is based on an on-chip interconnect. That is, the inventive concept may be applied to a system on chip that is based on an off-chip illustrated in FIG. 1. However, in embodiments to be described below, a description will be given under the assumption that the inventive concept is applied to a network on-chip that is based on an on-chip interconnect.

Figure 4:
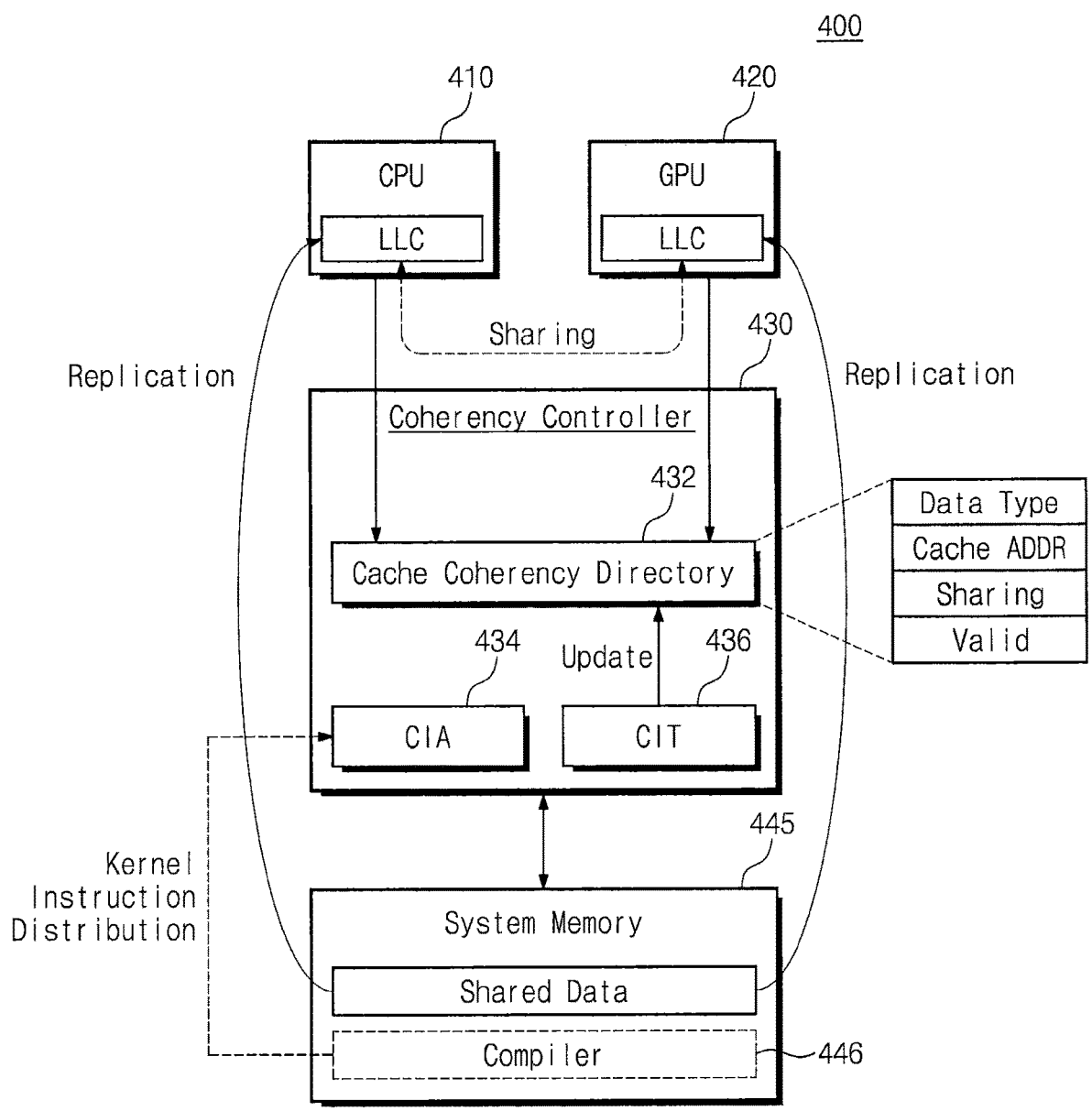
FIG. 4 is a block diagram illustrating a configuration and an operation of a heterogeneous computing system according to some embodiments of the inventive concept.

FIG. 4 is a block diagram illustrating a configuration and operations of a heterogeneous computing system according to some embodiments of the inventive concept. A heterogeneous computing system 400 may include a CPU 410, a GPU 420, a coherency controller 430, and a system memory 445. As described above, the CPU 410, the GPU 420, and the coherency controller 430 may constitute a network on-chip that is manufactured with one chip.

First, for purposes of illustration, it is assumed that a program offloaded from the CPU 410 includes a plurality of kernels and the plurality of kernels are sequentially executed. GPU kernels may be analyzed before GPU kernels are executed by the GPU 420. For example, a compiler 446 that is loaded to and executed on the system memory 445 may analyze instructions of each kernel. The instructions of the plurality of kernels may include an arithmetic command, load and store commands, a texture command, and/or any other commands. An analysis result (i.e., a kernel instruction distribution) of the compiler 446 is transferred to a first analyzer (that is, coherency impact analyzer; CIA) 434.

The coherency controller 430 may include a cache coherency directory 432, the first analyzer 434, and a second analyzer (that is, coherency impact tracker; CIT) 436. The cache coherency directory 432 may include a data type, a cache address, sharing information, and validity information to be referenced by the CPU 410 and/or the GPU 420. Here, the sharing information includes information about whether data to be referenced by a cache address is shared by the CPU 410 and the GPU 420.

The first analyzer 434 may statically analyze each kernel before GPU kernels are executed. For example, the first coherency impact analyzer 434 may determine whether each kernel has a memory-bound characteristic or a compute-bound attribute, based on the kernel instruction distribution received from the compiler 446.

If a ratio of instructions, which have a specific attribute, to all instructions of a kernel is greater than or equal to a threshold value, the first analyzer 434 may classify the corresponding kernel as a kernel having a memory-bound characteristic. Here, the instruction having the specific attribute may be an instruction associated with loading from the CPU 410 and/or storing to the CPU 410. In other words, the loading from the CPU 410 may mean offloading a GPU kernel and/or loading an intermediate processing result of the CPU 410. The storing to the CPU 410 may return an intermediate processing result or a final processing result of the GPU 420.

The analysis result of the first coherency impact analyzer 434 may be stored in a memory (e.g., a last level cache LLC and/or an upper level cache) of the CPU 410, but the embodiments of inventive concept are not limited thereto.

In the embodiments of FIG. 4, the first coherency impact analyzer 434 is illustrated as a hardware block included in the coherency controller 430. However, in other embodiments, alternatively or additionally, the coherency controller 430 may be a software module that is loaded to and executed on the system memory 445, or a dedicated memory (not illustrated) included in or connected to the GPU 420.

A kernel classified by the first analyzer 434 may be executed by the CPU 410 or the GPU 420. That is, a kernel having the memory-bound characteristic may be processed in a cache coherent manner, and a processing result of the kernel may be shared through the last level caches LLC. In contrast, a kernel having the compute-bound characteristic may be processed in a non-cache coherent manner, and a processing result of the kernel may be shared through the system memory 445.

The efficiency of data sharing between the CPU 410 and the GPU 420 may be improved by uniformly analyzing kernels based on the analysis result of the compiler 446. However, data exchange (i.e., transaction) may be made between the CPU 410 and the GPU 420 while a kernel to be processed in the non-cache coherent manner is executed. In this case, data sharing through the last level caches LLC may be more effective than data sharing through the system memory 445.

In some embodiments of the inventive concept, the second analyzer 436 may reclassify a kernel having the compute-bound characteristic while a kernel is executed. For example, the second analyzer 436 may monitor data exchange between the CPU 410 and the GPU 420 in real time. In addition, the second coherency impact tracker 436 additionally may monitor various factors associated with data exchange between the CPU 410 and the GPU 420. A process in which the second coherency impact tracker 436 reclassifies a kernel being executed will be more fully described below.

When it is determined that data is exchanged between the CPU 410 and the GPU 420 on a frequent basis while a kernel to be processed in a non-cache coherent manner is executed, the second analyzer 436 may update the cache coherency directory 432, such that the kernel being executed is processed in the cache coherent manner. As a result, data sharing of the CPU 410 and the GPU 420 during execution of a kernel may be made through the last level caches LLC. That is, shared data stored in the system memory 445 may be replicated to a sharing cache region.

The embodiments of FIG. 4 described above are based on FIG. 3A. However, the embodiments of FIG. 4 may be applied to the embodiments of FIGS. 3B to 3D through appropriate modifications/changes.

Figure 5:
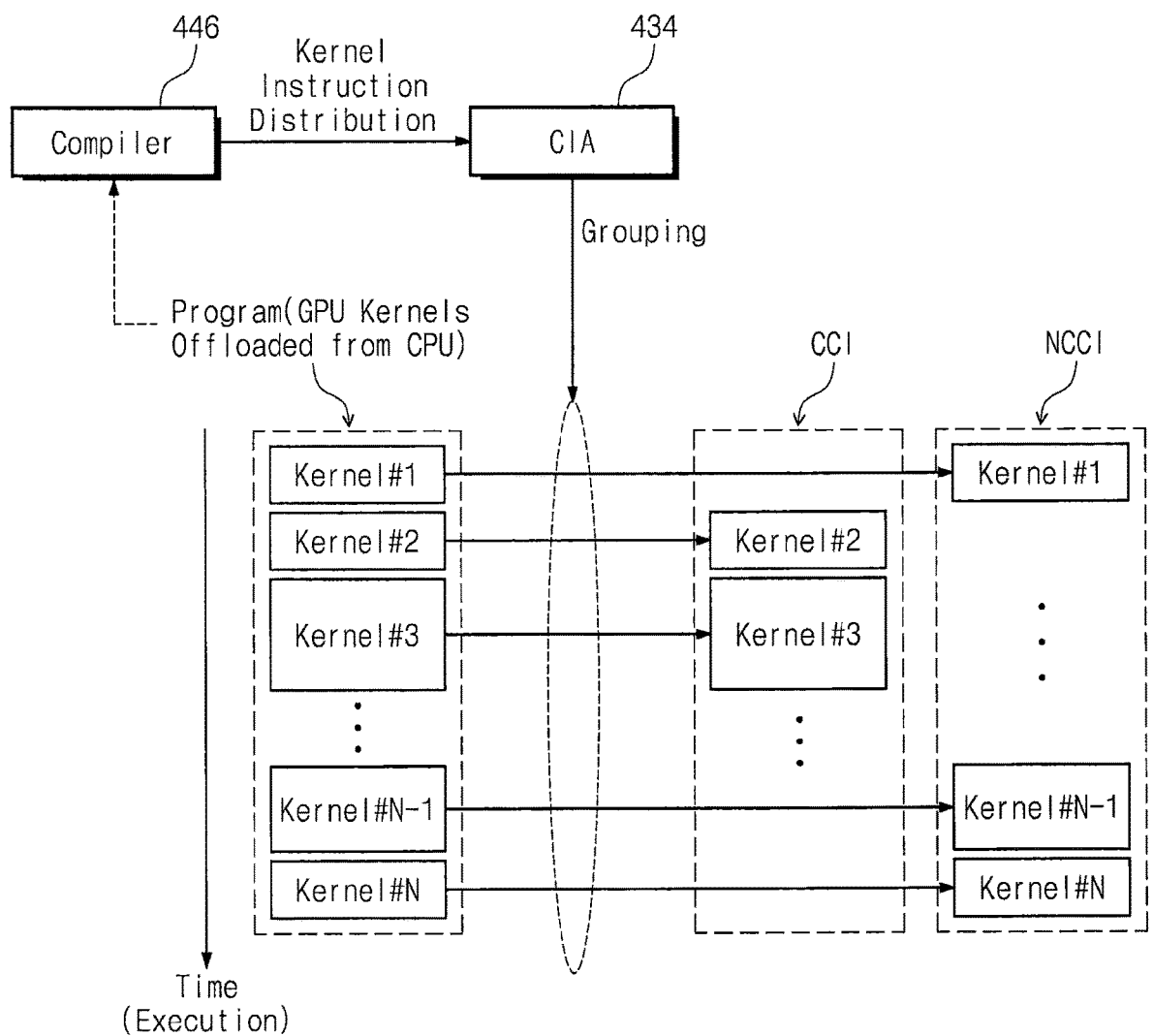
FIG. 5 is a view conceptually illustrating operations of a first coherency impact analyzer illustrated in FIG. 4 according to some embodiments of the inventive concept.

FIG. 5 is a view conceptually illustrating operations of the first coherency impact analyzer 434 illustrated in FIG. 4 according to some embodiments of the inventive concept. As described above, a program offloaded from a CPU includes a plurality of GPU kernels Kernel #1 to Kernel #N, which are sequentially executed by the CPU 410 or the GPU 420. For better understanding, a description will be given with reference to FIGS. 4 and 5 together.

The GPU kernels Kernel #1 to Kernel #N are analyzed by the compiler 446 before execution. The first analyzer 434 may sequentially classify a kernel to be executed based on an analysis result (i.e., a distribution of kernel instructions). For example, the first coherency impact analyzer 434 may classify kernels, for which data exchanges between the CPU 410 and the GPU 420 are expected to be frequent, as a first group. Kernels belonging to the first group indicated by the CCI may be processed in a cache coherent manner. In contrast, the first analyzer 434 may classify kernels, for which data exchanges between the CPU 410 and the GPU 420 are expected to be rare or infrequent, as a second group. Kernels of the second group indicated by the NCCI may be processed in a non-cache coherent manner.

Afterwards, the GPU 420 may sequentially execute kernels from the kernel Kernel #1 to the kernel Kernel #N.

Figure 6:
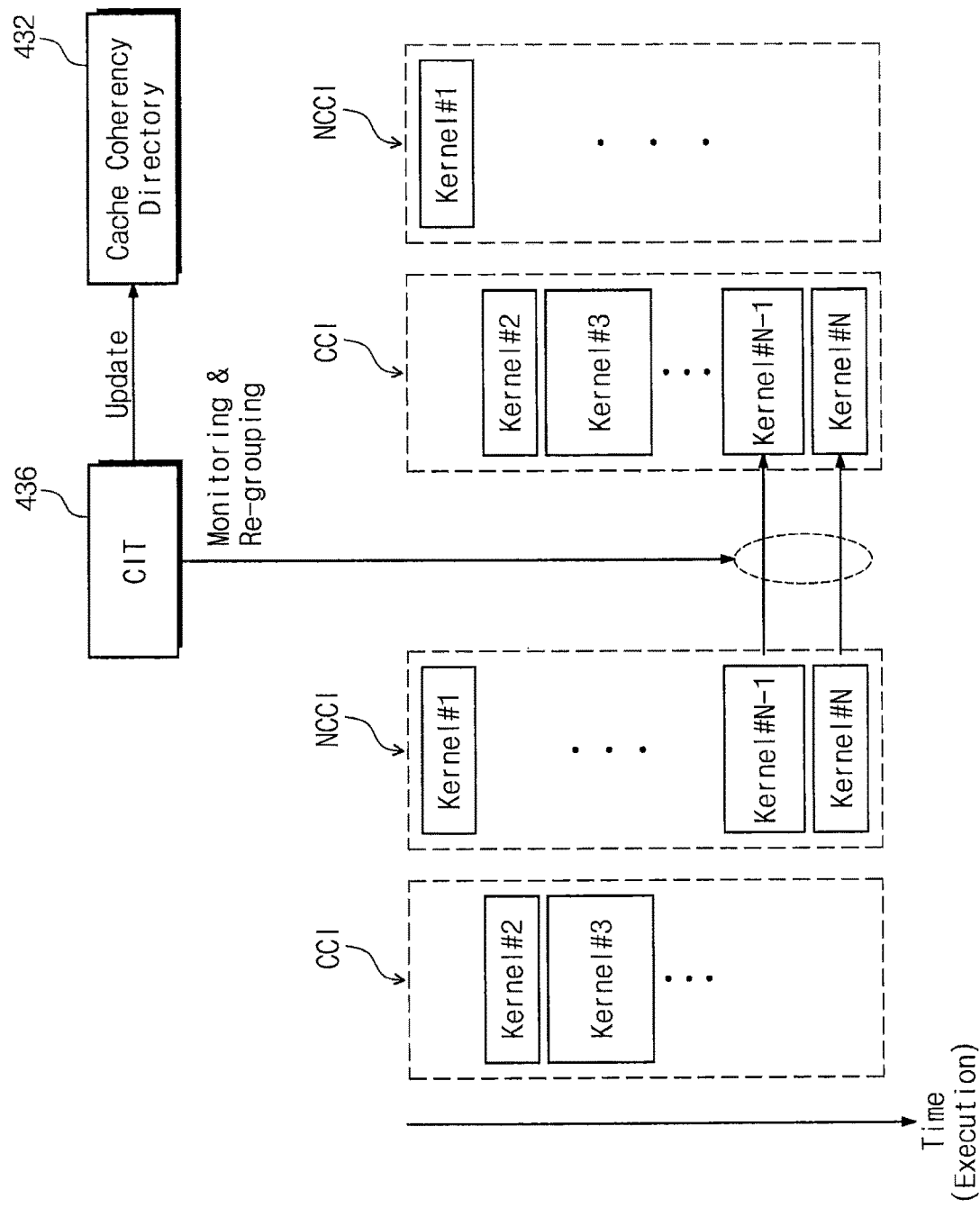
FIG. 6 is a view conceptually illustrating operations of a second analyzer or coherency impact tracker illustrated in FIG. 4 according to some embodiments of the inventive concept.

FIG. 6 is a view conceptually illustrating operations of the second analyzer or second coherency impact tracker 436 illustrated in FIG. 4. For better understanding, a description will be given with reference to FIGS. 4 and 6 together.

The second coherency impact tracker 436 may monitor data exchange or the like between the CPU 410 and the GPU 420 while each kernel is executed and may reclassify a kernel being executed based on a result of the monitoring. A kernel targeted for monitoring and reclassifying is a kernel of the second group indicated by the NCCI. A kernel, for which data exchange between the CPU 410 and the GPU 420 is determined to be frequent from among kernels of the second group, may be reclassified to belong to the first group. For example, the number of times of exchange and/or an exchange frequency may be considered. In an embodiment, an example is illustrated in FIG. 6 as kernels Kernel #N−1 and Kernel #N are reclassified to belong to the first group.

The second coherency impact tracker 436 may update the cache coherency directory 432 with regard to the reclassified kernels Kernel #N−1 and Kernel #N. As the cache coherency directory 432 is updated, a data type, a cache address, sharing information, and validity information of the reclassified kernels Kernel #N−1 and Kernel #N may be updated. That is, the CPU 410 and the GPU 420 may share data through the last level caches LLC with reference to information of the cache coherency directory 432 instead of the system memory 445.

Figure 7A:
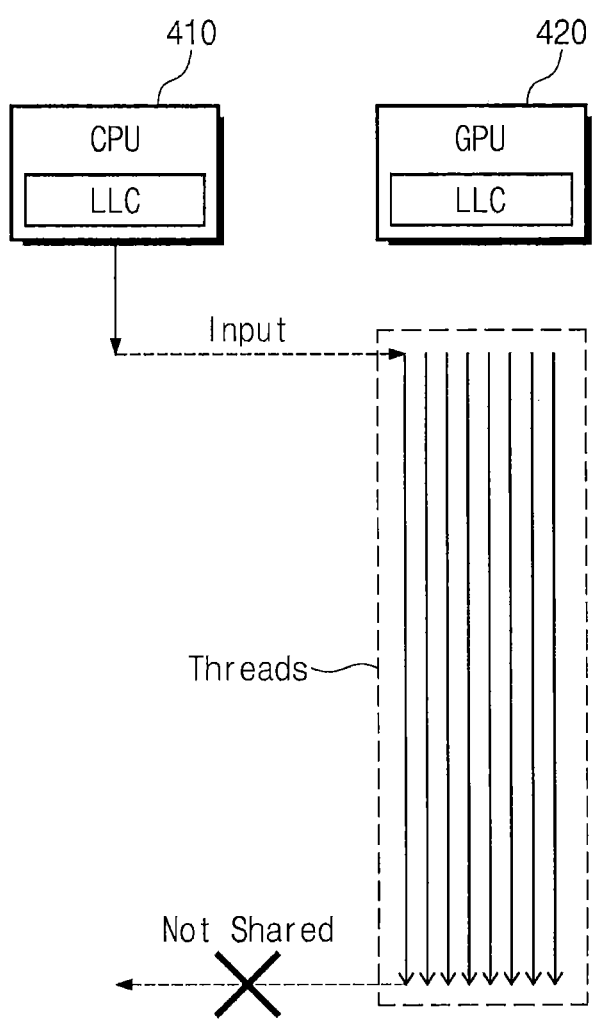
FIGS. 7A and 7B are views conceptually illustrating how a kernel offloaded from a central processing unit (CPU) is executed by a graphic processing unit (GPU) according to some embodiments of the inventive concept.
Figure 7B:
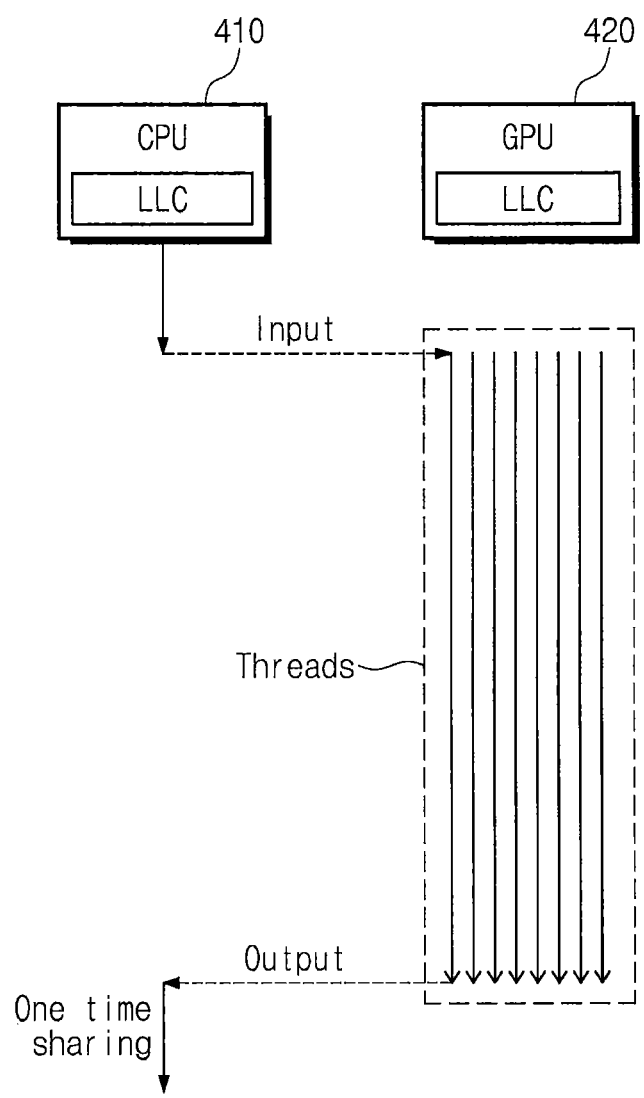

FIGS. 7A and 7B are views conceptually illustrating how a kernel offloaded from a CPU is executed by a GPU according to some embodiments of the inventive concept. For better understanding, a description will be given with reference to FIGS. 4 and 6 together.

FIG. 7A shows the example where data is not shared between the CPU 410 and the GPU 420. A kernel offloaded from the CPU 410 is transferred as an input of the GPU 420. The GPU 420 processes threads of the offloaded kernel. For example, the embodiments of FIG. 7A may correspond to the case of initializing a dedicated memory included in or connected to the GPU 420. Because the threads are processed only by the GPU 420, data are not shared between the CPU 410 and the GPU 420. In this case, because there is no need to process a kernel in a cache coherent manner, the kernel may be processed in a non-cache coherent manner.

FIG. 7B shows the example where data sharing is once made between the CPU 410 and the GPU 420. The GPU 420 may process threads of a kernel offloaded from the CPU 410, and a result of the processing is transferred to the CPU 410. For example, the embodiments of FIG. 7B may correspond to the example where the GPU 420 performs all operations and the CPU 410 receives and processes a result of the operations. Even though data are once shared between the CPU 410 and the GPU 420, a kernel being executed may be continuously processed in the non-cache coherent manner.

Figure 8:
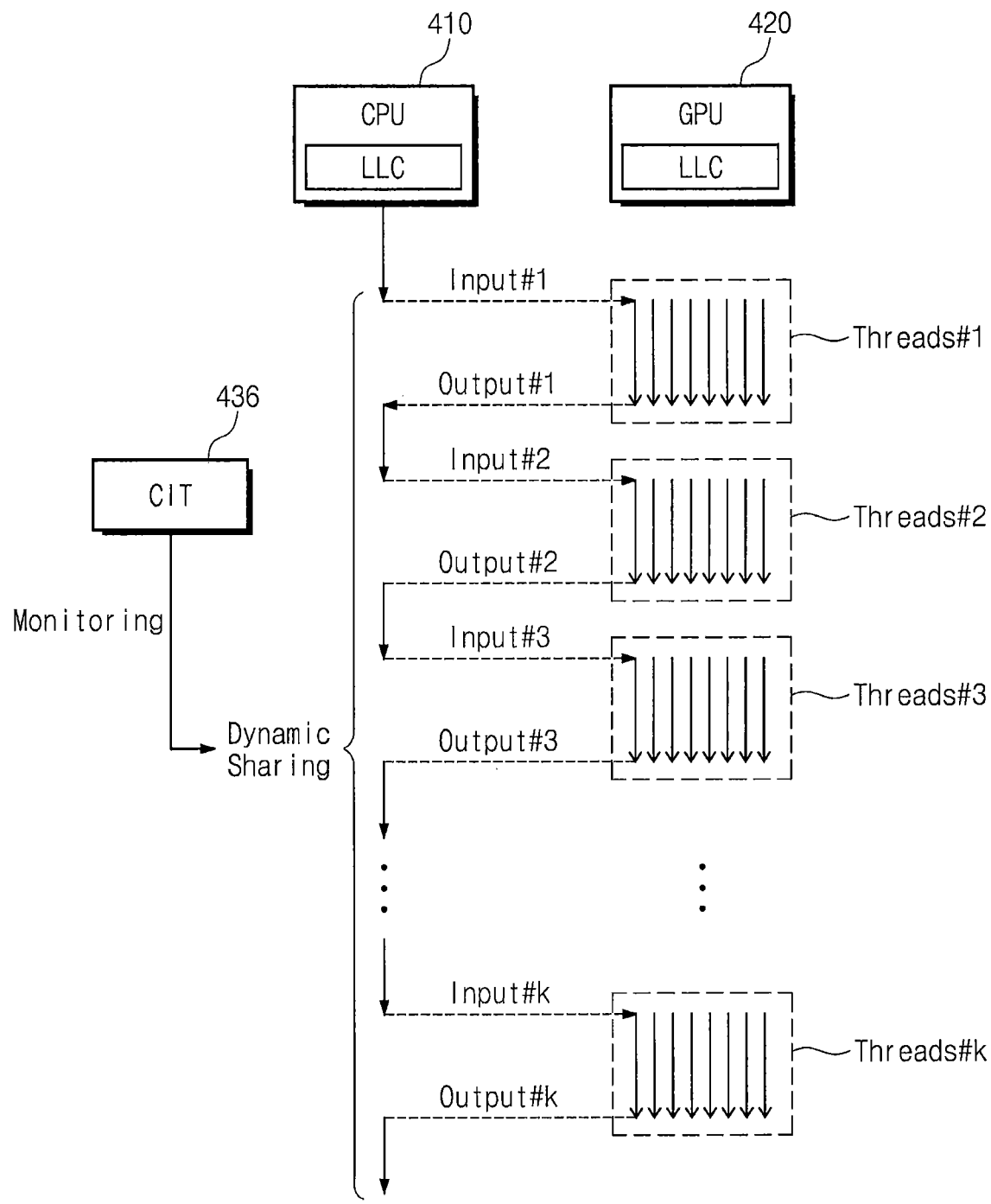
FIG. 8 is a view illustrating an example where frequent data sharing (i.e., dynamic sharing) is made between a CPU and a GPU according to some embodiments of the inventive concept.

FIG. 8 is a view illustrating the example where data is frequently shared (i.e., dynamic sharing) between the CPU 410 and the GPU 420. For better understanding, a description will be given with reference to FIGS. 4 and 6 together.

For example, a kernel offloaded from the CPU 410 is input to the GPU 420 as a first input Input #1. The GPU 420 processes first threads Threads #1 according to the first input Input #1 and outputs a first output Output #1 as a result of the processing. The CPU 410 processes the first output Output #1 being an intermediate result, and the intermediate result is input to the GPU 420 as a second input Input #2. A k-th output Output #k processed by the GPU 420 may be input to the CPU 410 through a series of processes described above.

It is understood from FIG. 8 that data exchange between the CPU 410 and the GPU 420 is frequent. For example, when an image frame is divided into a plurality of tiles and is processed in a unit of tile, data exchange between the CPU 410 and the GPU 420 may be frequent. The reason is that neighboring information of an adjacent tile may be used when processing any one of a plurality of tiles constituting an image frame. For another example, data exchange between the CPU 410 and the GPU 420 may be frequent when performing a complicated mathematical operation.

The second analyzer or coherency input tracker 436 may monitor data exchange between the CPU 410 and the GPU 420 in real time. The second coherency impact tracker 436 may determine that dynamic sharing of data is made between the CPU 410 and the GPU 420 based on, for example, the amount of data exchanged between the CPU 410 and the GPU 420, the number of times that data are exchanged, etc. The second analyzer or second coherency impact tracker 436 may reclassify a kernel, which is determined to dynamically share data, as the first group. In addition, the second analyzer or second coherency impact tracker 436 may update the cache coherency directory 432 with regard to a kernel being executed.

As the cache coherency directory 432 is updated, data sharing between the CPU 410 and the GPU 420 may be performed through the last level caches LLC instead of the system memory 445. That is, even though a kernel is being executed, the kernel reclassified as belonging to the first group may be processed in the cache coherent manner instead of an existing non-cache coherent manner (i.e., a way to process the reclassified kernel switches from a non-cache coherent manner to a cache coherent manner).

The description given in FIG. 8 is directed to embodiments in which a determination of whether data is dynamically shared is based on data exchange between the CPU 410 and the GPU 420. However, alternatively or additionally, other criteria may be further applied in making such a determination. Such embodiments will be described with reference to FIGS. 9, 10, and 11.

Figure 9:
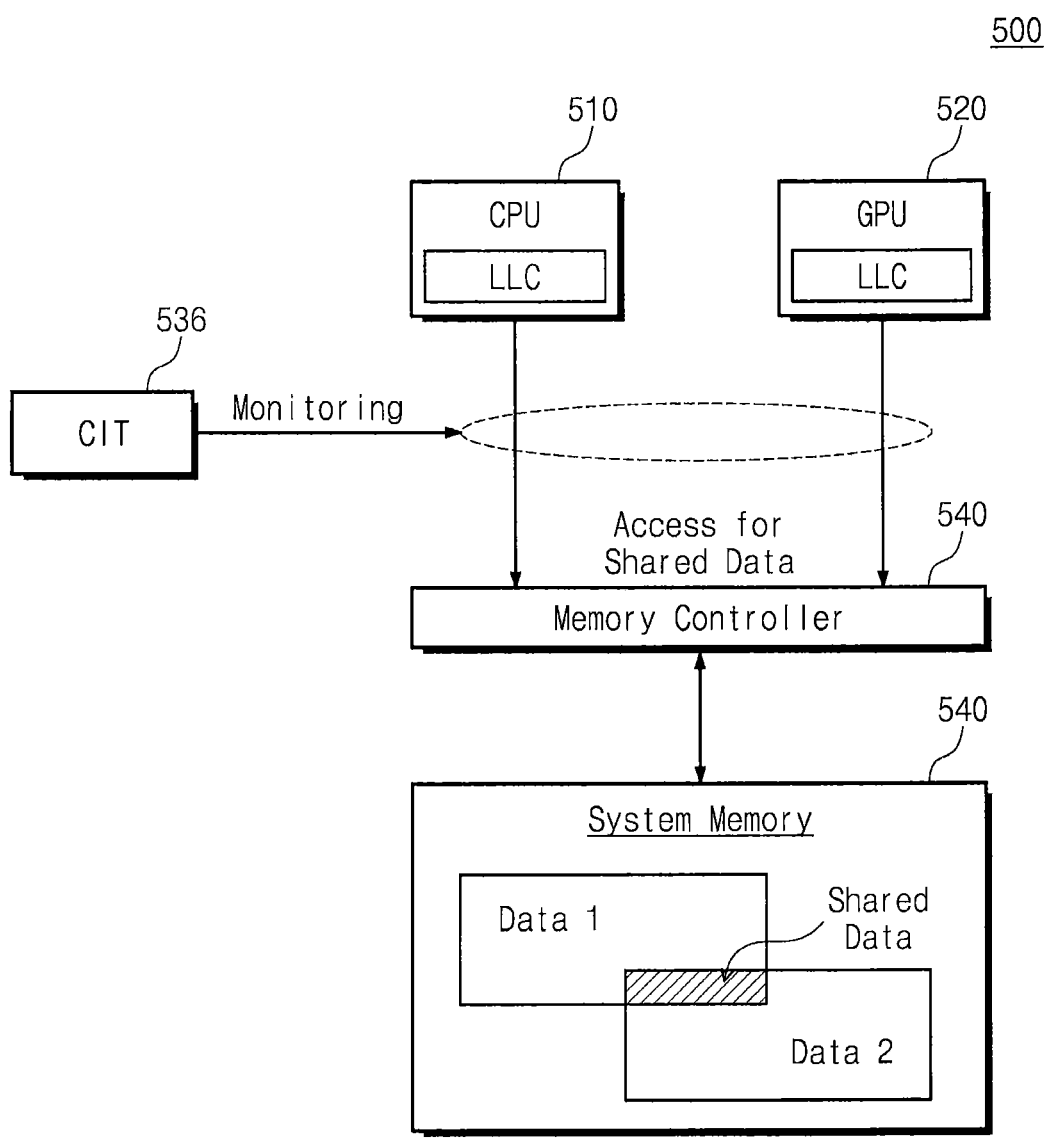
FIG. 9 is a block diagram conceptually illustrating example operations for determining that dynamic sharing of data is made between a CPU and a GPU according to some embodiments of the inventive concept.

FIG. 9 is a block diagram conceptually illustrating operations to determine that data is dynamically shared between a CPU 510 and a GPU 520 according to some embodiments of the inventive concept. For better understanding, a description will be given with reference to FIGS. 4 and 9 together.

First, it is assumed that a kernel being executed is being executed in a non-cache coherent manner and processing results Data1 and Data2 of the CPU 510 and the GPU 520 are stored in a system memory 545. That is, data sharing between the CPU 510 and the GPU 520 is executed through the system memory 545.

If data exchange between the CPU 510 and the GPU 520 is frequent, a command and an address for accessing a specific region of the system memory 545 may be frequently generated. In this case, a second analyzer or second coherency impact tracker 536 may monitor a command and/or an address for accessing a region of the system memory 545, in which shared data are stored. If it is determined that the region of the system memory 545, in which shared data are stored, is frequently accessed, the second coherency impact tracker 536 may determine that dynamic sharing of data is made by the CPU 510 and the GPU 520. For example, the number of times or the frequency of issue of a command and/or an address may be considered as a criterion for determining dynamic sharing of data.

In the example where it is determined that a processing result of a kernel being executed by the GPU 520 is frequently shared by the CPU 510, data shared by the CPU 510 and the GPU 520 may be replicated to at least one of the last level caches LLC of the CPU 510 and the GPU 520. The second coherency impact tracker 536 may update a cache coherency directory 532, and the CPU 510 and/or the GPU 520 may access shared data with reference to the updated cache coherency directory 532.

Figure 10:
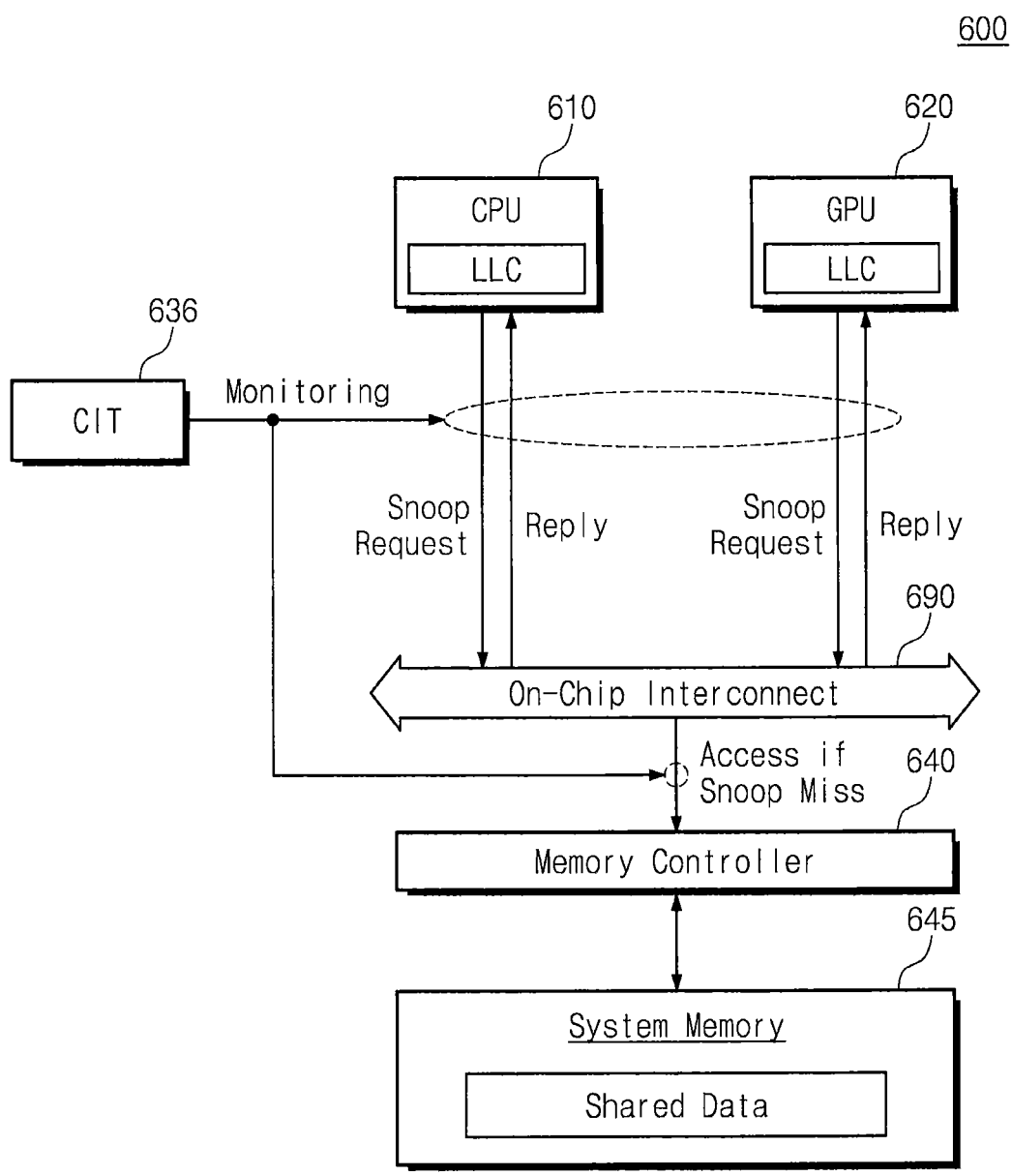
FIG. 10 is a block diagram conceptually illustrating further example operations for determining that dynamic sharing of data is made between a CPU and a GPU according to some embodiments of the inventive concept.

FIG. 10 is a block diagram conceptually illustrating further operations to determine that dynamic sharing of data is made between a CPU 610 and a GPU 620 according to some embodiments of the inventive concept. In the embodiments of FIG. 10, a snoop request and a reply issued to maintain a cache coherency may be used upon determining that dynamic sharing of data is made between the CPU 610 and the GPU 620. For better understanding, a description will be given with reference to FIGS. 4 and 10 together.

The CPU 610 may monitor an on-chip interconnect 690 for the purpose of maintaining a cache coherency of a heterogeneous computing system 600 including the CPU 610 and the GPU 620. If a cache coherency of data stored in the last level cache LLC of the GPU 620 is maintained, the on-chip interconnect 690 may transmit a replay corresponding to the cache coherency to the CPU 610, and vice versa (i.e., a cache coherency of data stored in the last level cache LLC of the CPU 610).

For example, when a snoop request and a reply are frequently generated, data sharing may be made through the last level caches LLC of the CPU 610 and the GPU 620. Therefore, shared data associated with the snoop request and the reply may be data that may benefit from fast processing.

If a cache coherency is not maintained in the CPU 610 and/or the GPU 620 (i.e., snoop miss), an on-chip interconnect 690 may access a region of a system memory 645 in which shared data are stored. In this example, a second coherency impact tracker 636 may monitor an access to the system memory 645 where the shared data are stored. As described above, because the snoop miss may occur while data is frequently shared between the CPU 610 and the GPU 620, there may be a need to quickly process a kernel being executed in the GPU 620 in a cache coherent manner.

The second analyzer 636 may update a cache coherency directory (e.g., 432 of FIG. 4) with regard to the shared data stored in the system memory 645. As a result of the updating, the shared data stored in the system memory 645 may be replicated to the last level caches LLC of the CPU 610 and/or the GPU 620, and, thus, a cache coherency may be maintained. Afterwards, the kernel being executed in the GPU 620 may be processed in a cache coherent manner.

Figure 11:
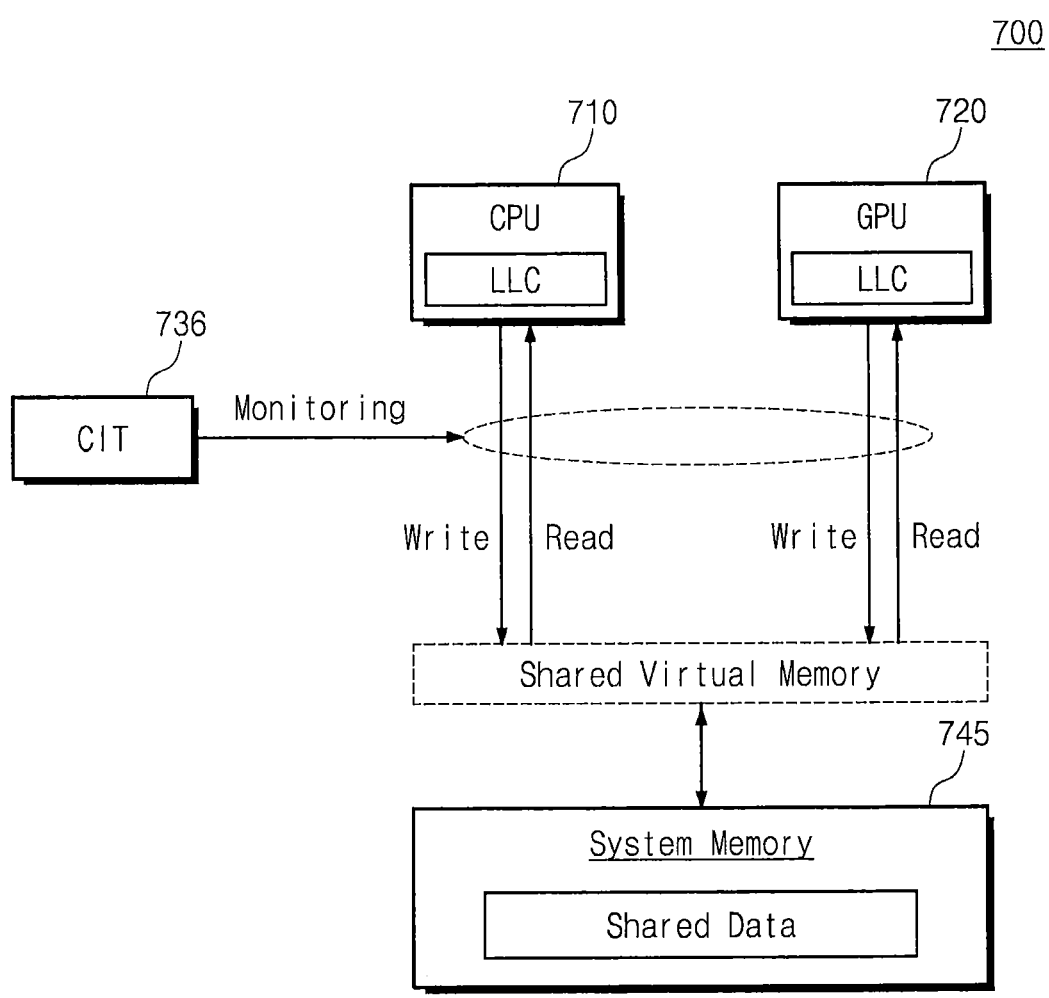
FIG. 11 is a block diagram conceptually illustrating still further example operations for determining that dynamic sharing of data is made between a CPU and a GPU according to some embodiments of the inventive concept.

FIG. 11 is a block diagram conceptually illustrating further operations to determine that dynamic sharing of data is made between a CPU 710 and a GPU 720 according to some embodiments of the inventive concept. In the embodiment of FIG. 11, a shared virtual memory (SVM) may be used upon determining that dynamic sharing of data is made between the CPU 710 and the GPU 720. For better understanding, a description will be given with reference to FIGS. 4 and 11 together.

In a heterogeneous computing system where a plurality of (in particular, heterogeneous) processors are implemented in one chip, the shared virtual memory may be used for the heterogeneous processors to effectively access a system memory. For example, data sharing may be determined by monitoring writing data processed by the CPU 710 in the shared virtual memory and writing data processed by the GPU 720 in the shared virtual memory. Likewise, reading data from the shared virtual memory may be monitored.

If data stored in a system memory 745 are frequently shared by the CPU 710 and the GPU 720, and the sharing is determined based on a result of monitoring the reading/writing for the shared virtual memory, a second coherency impact tracker 736 may update a cache coherency directory (e.g., 432 of FIG. 4) with regard to the shared data stored in the system memory 745. As a result of the updating, the shared data stored in the system memory 745 may be replicated to the last level caches LLC of the CPU 710 and/or the GPU 720. Afterwards, the kernel being executed in the GPU 720 may be processed in a cache coherent manner.

Various criteria may be used to determine whether dynamic sharing of data is made between the CPU 710 and the GPU 720. For example, in the second coherency impact tracker 736 may monitor the number of times a cache miss occurs and/or the frequency of an access to the system memory 745.

Figure 12:
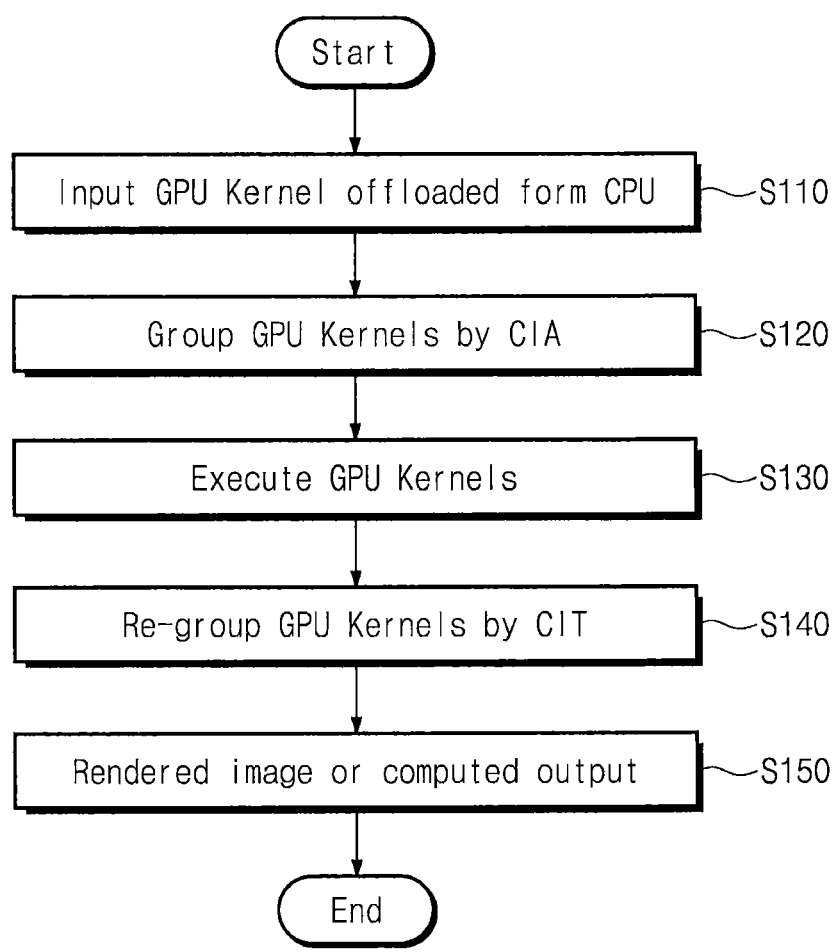
FIG. 12 is a flowchart illustrating methods of controlling a cache coherency of a heterogeneous computing system according to some embodiments of the inventive concept.

FIG. 12 is a flowchart illustrating methods of controlling a cache coherency of a heterogeneous computing system according to some embodiment of the inventive concept. For better understanding, a description will be given with reference to FIGS. 4, 6 and 12 together.

At block S110, GPU kernels offloaded from the CPU 410 may be input or provided to the GPU 420. The kernels offloaded from the CPU 410 may constitute a program and the plurality of kernels are sequentially executed by the GPU 420.

At block S120, a first analysis is made by the first analyzer 434 before the GPU kernels are executed. The first analyzer 434 may classify the kernels into two groups based on a kernel instruction distribution received from the compiler 446. For example, a first group may include kernels in which data sharing is frequently made between the CPU 410 and the GPU 420, and a second group may include kernels in which data sharing is rarely or infrequently made between the CPU 410 and the GPU 420. For example, an instruction targeted for determination of dynamic sharing may be an instruction associated with loading from the CPU 410 to the GPU 420 and/or an input from the GPU 420 to the CPU 410.

At block S130, the GPU kernels may be executed. As described above, the GPU kernels may be sequentially executed. Also, the kernels of the first group may be executed in a cache coherent manner, and the kernels of the second group may be executed in a non-cache coherent manner.

At block S140, one or more of the kernels of the second group may be reclassified by the second analyzer 436. Even though a kernel is classified based on the kernel instruction distribution received from the compiler 446 as belonging to the second group, a kernel associated with dynamic sharing of data with the CPU 410 may exist. Therefore, the second analyzer 436 may reclassify a kernel, which is determined to dynamically share data, as the first group.

The kernel reclassified as belonging to the first group, even though it is processed by the GPU 420, may be changed such that the kernel is processed in a cache coherent manner. For example, in the embodiment of FIG. 2, the on-chip network switch of the router "R" may perform an appropriate switching operation such that the kernel reclassified into the first group is processed in the cache coherent manner.

At block S150, results of the kernels processed by the GPU 420 may be collected and processed by the CPU 410, and a rendering image or a computed result associated with the GPU kernels may be provided to a user.

Figure 13:
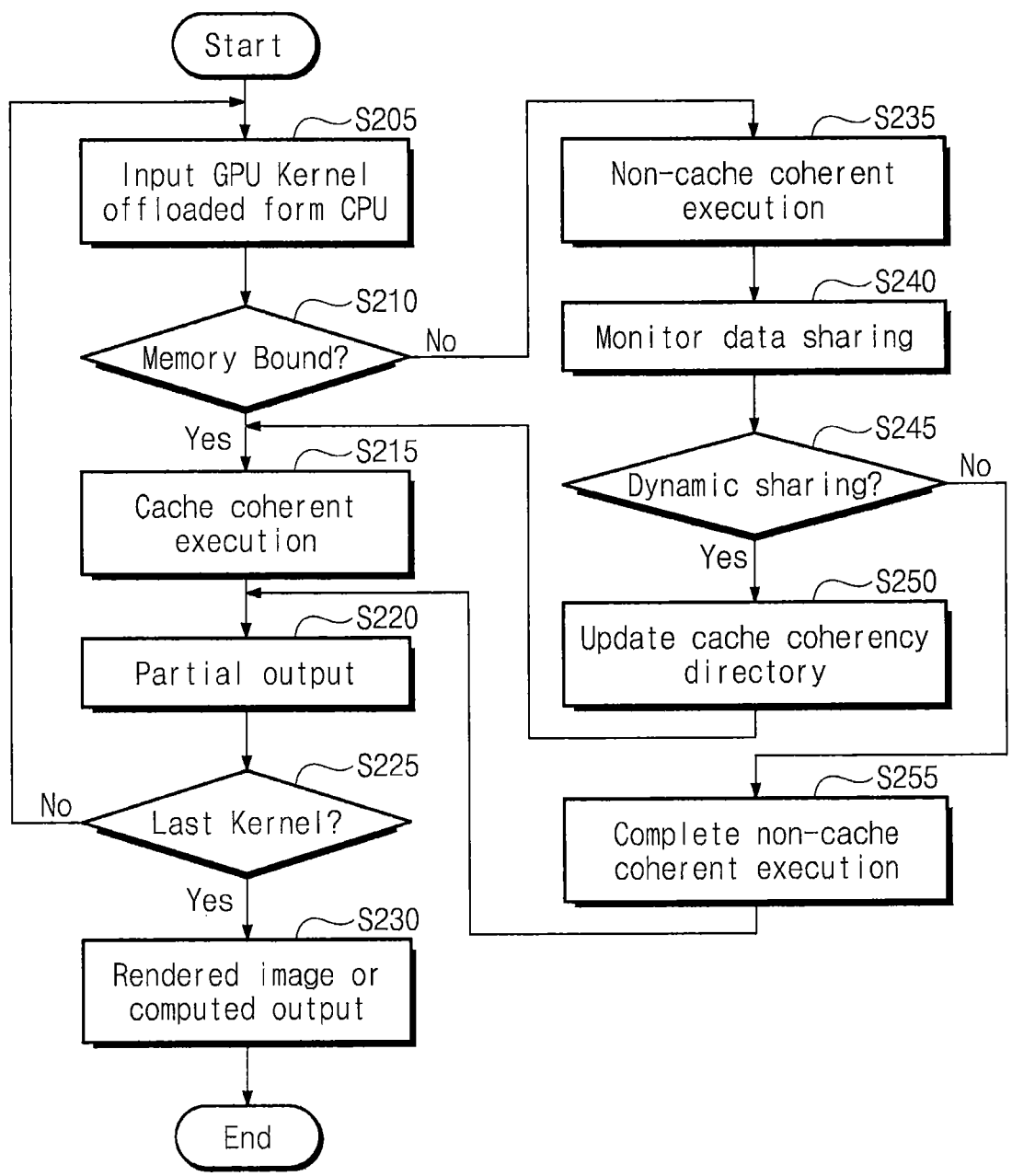
FIG. 13 is a flowchart illustrating methods of controlling a cache coherency of a heterogeneous computing system according to some embodiments of the inventive concept.

FIG. 13 is a flowchart illustrating methods of controlling a cache coherency of a heterogeneous computing system according to some embodiments of the inventive concept.

For better understanding, a description will be given with reference to FIGS. 4, 6, and 13 together.

At block S205, GPU kernels offloaded from the CPU 410 may be input or provided to the GPU 420.

At block S210, the GPU kernels are analyzed before execution to determine whether each kernel has a memory-bound characteristic. For example, the first analyzer 434 may determine an attribute of each kernel based on a kernel instruction distribution received from the compiler 446. For example, an attribute targeted for use in the determination may be an instruction associated with loading from the CPU 410 to the GPU 420 and/or an instruction associated with a processed result output from the GPU 420 to the CPU 410.

When it is determined that a kernel has the memory-bound characteristic (Yes), block S215 is executed. This means that data associated with the kernel processed by the GPU 420 is frequently shared by the CPU 410. In contrast, when it is determined that a kernel has the compute-bound characteristic (No), block S235 is executed. This means that data associated with the kernel processed by the GPU 420 are rarely or infrequently shared by the CPU 410.

At block S215, a kernel may be processed in a cache coherent manner. That is, a result of processing a GPU kernel at the GPU 420 may be shared through the last level caches LLC. A kernel is determined at block S210 as having the memory-bound characteristic because data is frequently shared between the CPU 410 and the GPU 420. An intermediate processing result of the GPU kernel may be input to the CPU 410, and the CPU 410 may accumulate the processing result or may perform following additional processing (block S220).

At block S225 a determination is made whether a kernel being currently executed is the last kernel. When it is determined that the kernel being currently executed is the last kernel (Yes), block S230 is executed; when it is determined that the kernel being currently executed is not the last kernel (No), the process proceeds to block S205.

At block S230, results of the kernels processed by the GPU 420 may be collected and processed by the CPU 410, and a rendering image or a computed result associated with the GPU kernels may be provided to a user.

When the kernel has the compute-bound characteristic, at block S235, the kernel is processed in a non-cache coherent manner. This means that data associated with the kernel processed by the GPU 420 are rarely or infrequently shared by the CPU 410. Data associated with the kernel processed by the GPU 420 may be shared through the system memory 445 instead of the last level caches LLC.

At block S240, the second analyzer or second coherency impact tracker 136 may monitor data sharing between the CPU 410 and the GPU 420.

At block S245, the second analyzer or second coherency impact 136 may determine whether data is frequently exchanged between the CPU 410 and the GPU 420 (i.e., dynamic sharing). For example, the second coherency impact tracker 436 may determine whether data is frequently exchanged between the CPU 410 and the GPU 420, based on, for example, data exchange between the CPU 410 and the GPU 420, a snoop request and reply, a read/write operation for a shared virtual memory, an access to a system memory due to a continuous cache miss, etc.

When it is determined that data is dynamically shared (Yes), block S250 is executed; if not (No), the process proceeds to block S255.

At block S250, a cache coherency directory associated with a GPU kernel being executed may be updated. As a result, the GPU kernel may be processed in a cache coherent manner. That is, a result of processing the GPU kernel may be shared by the CPU 410 and the GPU 420 through the last level caches LLC.

At block S255, the GPU kernel being executed may be completely processed. Because data associated with the GPU kernel being executed is determined to not be dynamically shared, the GPU kernel may be continuously processed in a non-cache coherent manner.

According to embodiments of the inventive concept, a heterogeneous computing system may be provided that controls a cache coherency adaptively based on the sharing of data between a CPU and a GPU.

In addition, according to embodiments of the inventive concept, kernels may be classified based on attributes of instructions of kernels. In some embodiments, a kernel may be reclassified based on the exchange of data between the CPU and the GPU while the kernel is executed, thereby allowing a cache coherency to be adaptively controlled.

Further Definitions and Embodiments

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," "part," "unit," or "system." For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof. Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present inventive concept are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. A heterogeneous computing system comprising:
    a first processor;
    a second processor configured to sequentially execute a plurality of kernels offloaded from the first processor, wherein the first processor and the second processor are heterogeneous; and
    a coherency controller configured to classify each of the plurality of kernels into one of a first group and a second group based on attributes of instructions included in each of the plurality of kernels before the plurality of kernels are executed, and is further configured to reclassify one of the plurality of kernels from the second group to the first group based on a transaction between the first processor and the second processor during execution of the one of the plurality of kernels.

2. The heterogeneous computing system of claim 1, wherein the first processor is a central processing unit (CPU), and the second processor is a graphic processing unit (GPU).

3. The heterogeneous computing system of claim 1, wherein a first one of the plurality of kernels classified into the first group is executed in a cache coherent manner where sharing of first data by the first processor and the second processor is performed by using at least one of last level caches of the first processor and the second processor, and
    wherein a second one of the plurality of kernels classified into the second group is executed in a non-cache coherent manner where sharing of second data by the first processor and the second processor is performed by using an external system memory.

4. The heterogeneous computing system of claim 1, wherein the coherency controller comprises:
    a first analyzer configured to classify each of the plurality of kernels into one of the first group and the second group based on the attributes of the instructions included in each of the plurality of kernels, before the plurality of kernels are executed, a second analyzer configured to reclassify the one of the plurality of kernels from the second group to the first group based on a degree in which data are shared by the first processor during execution of the one of the plurality of kernels; and a cache coherency directory configured to store information about the one of the plurality of kernels.

5. The heterogeneous computing system of claim 4, wherein the cache coherency directory is configured to store at least one of a data type, a cache address, sharing information, and validity information of data referenced by the first processor or the second processor.

6. The heterogeneous computing system of claim 1, wherein the instructions comprise an arithmetic command, a load command from the first processor to the second processor, a store command from the second processor to the first processor, and a texture command.

7. The heterogeneous computing system of claim 6, wherein the coherency controller is further configured to:
classify each of the plurality of kernels into one of the first group and the second group based on a ratio of a number of the load command instruction and the store command instruction among the instructions included in each of the plurality of kernels.

8. The heterogeneous computing system of claim 1, wherein the coherency controller is further configured to reclassify the one of the plurality of kernels from the second group to the first group based on at least one of a frequency at which data associated with the one of the plurality of kernels are exchanged by the first processor, and a number of times the data associated with the one of the plurality of kernels are exchanged by the first processor.

9. The heterogeneous computing system of claim 1, wherein the first processor is further configured to:
collect execution results of the sequentially executed kernels and provide a result of the collection to a user.

10. The heterogeneous computing system of claim 1, wherein the heterogeneous computing system is a system on chip in which the first processor, the second processor, and the coherency controller are implemented with one chip.

11. A method of operating a heterogeneous computing system comprising:
offloading a plurality of kernels from the first processor to the second processor, wherein the first processor and the second processor are heterogeneous;
classifying each of the plurality of kernels into one of a first group and a second group based on attributes of instructions included in each of the plurality of kernels;
sequentially executing the plurality of kernels using the second processor,
wherein first ones of the plurality of kernels belonging to the first group are executed in a cache coherent manner, and
wherein second ones of the plurality of kernels belonging to the second group are executed in a non-cache coherent manner; and
reclassifying one of the second ones of the plurality of kernels from the second group to the first group based on a transaction between the first processor and the second processor during execution of the one of the second ones of the plurality of kernels.

12. The method of claim 11, wherein the first processor is a central processing unit (CPU), and the second processor is a graphic processing unit (GPU).

13. The method of claim 11, wherein first ones of the plurality of kernels are executed by sharing of first data by the first processor and the second processor using at least one of last level caches of the first processor and the second processor, and
wherein the second ones of the plurality of kernels are executed by sharing of second data by the first processor and the second processor using an external system memory.

14. The method of claim 11, wherein classifying each of the plurality of kernels comprises classifying each of the plurality of kernels into one of the first group and the second group based on a ratio of a number of a load command instruction from the first processor to the second processor and a store command instruction from the second processor to the first processor among the instructions included in each of the plurality of kernels.

15. The method of claim 14, wherein classifying each of the plurality of kernels comprises classifying respective ones of the plurality of kernels for which the ratio exceeds a threshold value into the first group.

16. A heterogeneous computing system comprising:
a central processing unit (CPU);
a graphic processing unit (GPU) configured to sequentially execute a plurality of kernels offloaded from the CPU; and
a coherency controller configured to classify each of the plurality of kernels into one of a first group and a second group based on attributes of instructions included in each of the plurality of kernels before the plurality of kernels are executed, and is further configured to reclassify one of the plurality of kernels from the second group to the first group based on a transaction between the CPU and the GPU during execution of the one of the plurality of kernels.

17. The heterogeneous computing system of claim 16, wherein a first one of the plurality of kernels classified into the first group is executed in a cache coherent manner where sharing of the data by the CPU and the GPU is performed by using at least one of last level caches of the CPU and the GPU, and
wherein a second one of the plurality of kernels classified into the second group is executed in a non-cache coherent manner where sharing of the data by the CPU and the GPU is performed by using an external system memory.

18. The heterogeneous computing system of claim 16, wherein the coherency controller comprises:
a first analyzer configured to classify each of the plurality of kernels into one of the first group and the second group based on the attributes of the instructions included in each of the plurality of kernels, before the plurality of kernels are executed,
a second analyzer configured to reclassify the one of the plurality of kernels from the second group to the first group based on a degree in which data are shared by the CPU during execution of the one of the plurality of kernels; and
a cache coherency directory configured to store information about the one of the plurality of kernels.

19. The heterogeneous computing system of claim 18, wherein the cache coherency directory is configured to store at least one of a data type, a cache address, sharing information, and validity information of data referenced by the CPU or the GPU.

20. The heterogeneous computing system of claim 16, wherein the coherency controller is further configured to reclassify the one of the plurality of kernels from the second group to the first group based on at least one of a frequency at which data associated with the one of the plurality of kernels are exchanged by the CPU, and a number of times the data associated with the one of the plurality of kernels are exchanged by the CPU.

\* \* \* \* \*